United States Patent
Chikusa et al.

(10) Patent No.: US 7,139,170 B2
(45) Date of Patent: Nov. 21, 2006

(54) DISK ARRAY DEVICE

(75) Inventors: Takashi Chikusa, Odawara (JP); Masanori Hori, Odawara (JP); Toshio Tachibana, Atami (JP); Takehiro Maki, Hadano (JP); Hirotaka Honma, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 10/975,539

(22) Filed: Oct. 29, 2004

(65) Prior Publication Data
US 2006/0039108 A1    Feb. 23, 2006

(30) Foreign Application Priority Data
Aug. 20, 2004    (JP)    ............................ 2004-240342

(51) Int. Cl.
*H05K 7/20*    (2006.01)
(52) U.S. Cl. ..................... 361/695; 361/690; 361/694; 174/16.1; 165/80.2; 165/122
(58) Field of Classification Search ..................... None
See application file for complete search history.

(56) References Cited

U.S. PATENT DOCUMENTS

| | | | | |
|---|---|---|---|---|
| 5,570,269 A | * | 10/1996 | Korikawa et al. | 361/685 |
| 5,969,942 A | * | 10/1999 | Heckner et al. | 361/695 |
| 6,000,623 A | * | 12/1999 | Blatti et al. | 236/49.3 |
| 6,542,363 B1 | * | 4/2003 | White | 362/695 |
| 6,563,706 B1 | * | 5/2003 | Strickler | 361/695 |
| 6,816,368 B1 | * | 11/2004 | Yokosawa | 361/685 |
| 6,819,560 B1 | * | 11/2004 | Konshak et al. | 361/687 |
| 6,847,528 B1 | * | 1/2005 | Sucharczuk et al. | 361/796 |
| 7,046,470 B1 | * | 5/2006 | Yamanashi et al. | 360/69 |

FOREIGN PATENT DOCUMENTS

JP    11-145658    11/1997

* cited by examiner

*Primary Examiner*—Boris Chervinsky
(74) *Attorney, Agent, or Firm*—Reed Smith LLP; Stanley P. Fisher, Esq.; Juan Carlos A. Marquez, Esq.

(57) ABSTRACT

In a disk array device for cooling respective sections including a HDD by a fan, drop of cooling efficiency by the difference of conditions of HDD mounted and unmounted sections is prevented and the use of a dummy HDD is deleted/eliminated. A housing contains a HDA mounted on the HDD, a power controller board for performing control to the HDD, a power unit for supplying power to each section, a fan for cooling the housing therein, and a backboard for connecting all the sections. On one backboard surface, the HDA is mounted, which has a cooling function for making cooling air flowing in the housing and exhausting air from the housing via a region on which the HDA are mounted and via a vent hole on the backboard. For the vent hole, a shutter is mounted, which has a mechanism for adjusting an open area rate of the vent hole by opening when the HDA is mounted and closing when removed.

20 Claims, 19 Drawing Sheets

FIG. 1A
FIG. 1B
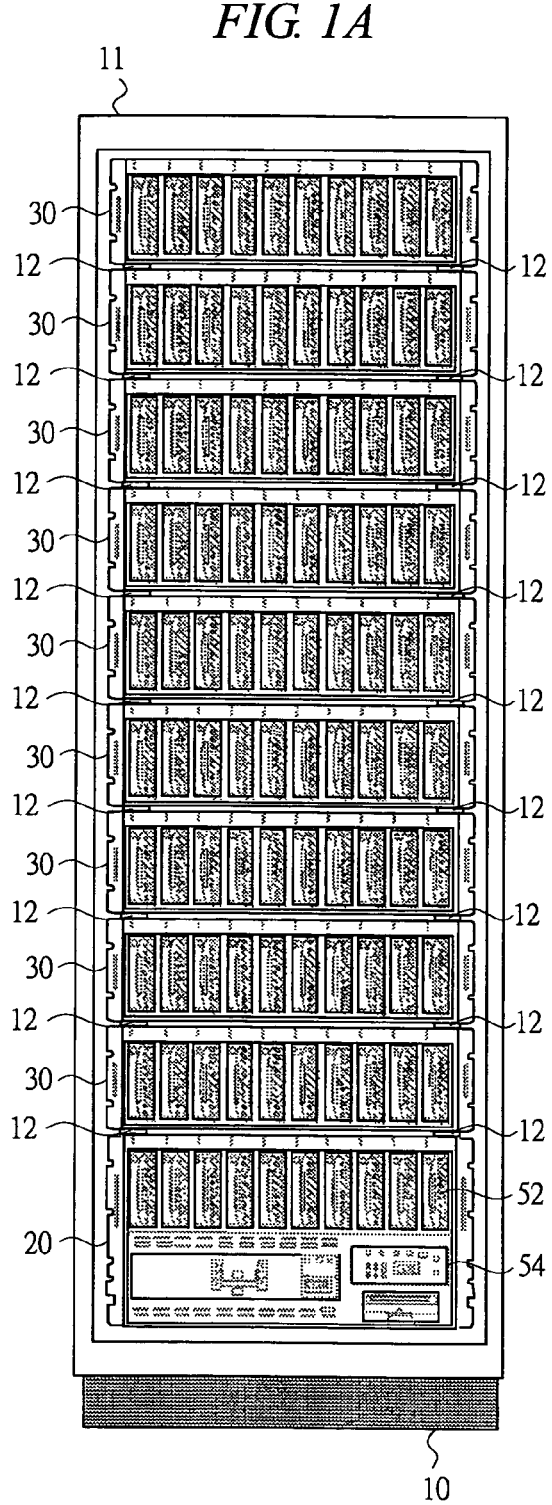
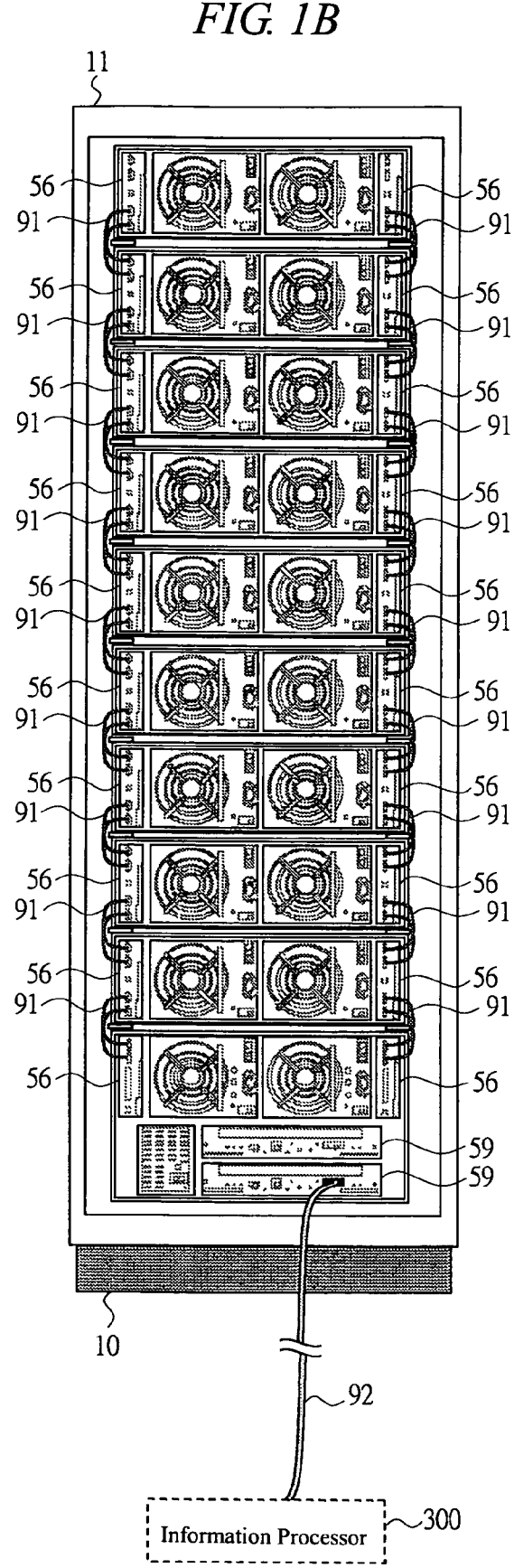

<At HDA Insertion>

<AT HDA Attached>

DISK ARRAY DEVICE

CROSS-REFERENCE TO RELATED APPLICATION

The present application claims priority from Japanese patent application No. JP 2004-240342 filed on Aug. 20, 2004, the content of which is hereby incorporated by reference into this application.

BACKGROUND OF THE INVENTION

The present invention relates to a disk array device (also called a storage system), and in particular, to a technique for cooling HDD (hard disk drive) and others to be installed in a housing.

As processing in a disk array device increases, it is essential to efficiently carry out cooling against the heat generated from each section inside the device including HDD. For the cooling means, a fan is installed in the disk array device, and the wind for air cooling (cooling air) is circulated to each component including HDDs inside the equipment by the fan operation.

In addition, in a disk array device in which a plurality of HDDs can be mounted, there occur an HDD mounted section (hereinafter, "HDD mounted section") and an HDD unmounted section (hereinafter, "HDD unmounted section"), and they cause variation of the flow rate (volume) or a flow velocity of the cooling air between the airflow routes that correspond to each section. With respect to air cooling by the fan, in the currently mainstream system, by mounting a dummy HDD which is a part of the shape same as HDA into the HDD unmounted section, the volume of cooling air in the vent passage of the HDD unmounted section is limited and the volume of cooling air in the vent passage of the HDD mounted section is secured. By this, drop of the cooling efficiency is prevented.

Japanese patent Laid-open No. 11-145658 discloses a technique for using dummy HDD.

SUMMARY OF THE INVENTION

By the hi-density mounted HDDs in a disk array device, the number of dummy HDDs used tends to increase. For example, for an device to which 14 to 15 HDDs per housing are able to be mounted, for example, 12 to 13 dummy HDDs are mounted per housing because the minimum configuration is basic at the time of device production. In addition, even if the adoption of 2.5-inch HDD or others is considered, in the conventional system, the number of dummy HDDs increases. The increase of the number of dummy HDDs results in an increase of cost. In addition, when HDDs are extended to a disk array device, dummy HDDs become wastes, causing an increase of environmental burden, too. Furthermore, dummy HDDs are not so much convenient because dummy HDDs must be kept in stock in case of emergency or others.

The present invention is made in view of the above-mentioned problems, and an object of the present invention is to provide a technique of a disk array device (disk array system), which is capable of mounting a plurality of storage units thereon and has a function of cooling the respective units in the device including the storage units by flow of cooling air by a fan operation, wherein reduction of cooling efficiency caused by a difference between conditions at a mounted section and an unmounted section of the storage unit can be prevented and using of dummy storage units (dummy HDDs) can be reduced or eliminated.

Outlines of representative ones of inventions disclosed in this application will be briefly described as follows. To achieve the above-mentioned object, the disk array device according to the present invention comprises technical means as shown in the following items (1) and (2).

(1) The disk array device according to the present invention comprises: a storage unit such as a HDD; a controller for controlling storage of data in said storage unit; a power unit for supplying power to each section; a fan (cooling fan unit and others) for cooling the inside of a housing (chassis) therein; a midplane board (backboard) for connecting each section including said storage unit, to one surface of which said storage unit is mounted via a connector, a cooling function for allowing the cooling air to flow into the housing by an operation of the fan and exhaust air from the housing via a plurality of vent holes on said backboard, a shutter of a mechanism located against the vent hole of the backboard, and a means for controlling (adjusting) the open area rate of the vent hole by opening and closing said shutter by mounting/unmounting of said storage unit.

The shutter is a mechanism for opening with the storage unit being mounted and keeping the vent hole open, and for closing with said storage unit being unmounted and keeping the vent hole closed. In other words, the shutter opens by the operation of inserting and connecting the storage unit to the housing-bay and closes by the operation of removing and disconnecting the storage unit from the housing. As the open area rate of the corresponding vent hole is adjusted by opening and closing of the shutter, the volume and the flow velocity of the cooling air that passes the relevant vent hole are adjusted.

By the means for adjusting the open area rate of the vent hole, the volume of the cooling air from the storage-unit unmounted section in the housing is restricted, the pressure drop caused by inflow of the cooling wind from the storage-unit unmounted section with less flow resistance is prevented, and the volume of the cooling air in the storage-unit mounted section is secured. Consequently, even when the storage-unit mounted and unmounted conditions are mixed, the cooling efficiency to each section including the storage unit can be secured without a need of mounting dummy storage units (dummy HDDs) of the shape similarly to the storage unit in the region to which the storage units are mounted.

In the disk array unit according to the present invention, the storage unit is typically a unit (HDA) mounted with a HDD. In addition, for example, in the backboard, the vent holes are provided in units of locations of the storage units and the shutters are provided in the units of the vent holes.

In the present invention, in a housing (basic chassis, extended chassis, and others) which forms a disk array device, structures such as the shutter are provided not on the front surface etc. but on the backboard side. In the housing, for the layout and configuration of each section, for example, with the backboard set in-between, a mountable region is arranged by arranging a plurality of the storage units on one side of the housing and the fan, power (supply) unit, and others on the other side. In the housing, there is a vent passage in which by the operation of the fan, the cooling air flows from the side of the storage unit, passes through the vent hole of the backboard, and is exhausted from the fan side of the housing.

In addition, for example, the shutter has a construction to keep part of a region of the vent hole open with the shutter being closed to the maximum under an unmounted condition of the storage unit. For example, it is configured in such a manner that by the construction of the shutter, a volume of the cooling air at the mounted section of the storage unit and that at the unmounted section are adjusted so as to be almost the same. That is, the volumes of the cooling air are balanced throughout the housing irrespective of mixture of the storage-unit mounted and unmounted sections.

In addition, for example, the shutter is designed to have an area that closes the vent hole in such a manner that the volume of the cooling air at the mounted section of the storage unit is greater than that at the unmounted section. That is, the cooling efficiency in the vent passage for the storage-unit mounted section is relatively increased by the mixed presence of the storage-unit unmounted section throughout the whole housing.

In addition, in the disk array device according to the present invention, the following configuration is possible in addition to the configuration to mount the shutter directly on the vent hole of the backboard.

For example, the shutter has a mechanism for closing like a door and for being open-pushed by a convex (protruded) structure, such as pin and others, provided on the backboard connection surface side of the storage unit, for example, the vertical position of the relevant connection surface, when the storage unit is mounted.

In addition, for example, the shutter is arranged and formed to guide flow of the cooling air in response to the arrangement of the objects (board, unit, parts, and others) for cooling before and after the vent hole.

In addition, for example, the shutter has a mechanism for being opened by motion of a convex structure, for example, a lever, a plate, and a spring portion, etc., provided on the surface on the side of the backboard on which the storage unit is mounted by being pressed through the storage unit when the storage unit is mounted.

In addition, for example, the shutter is provided to a support structure provided behind the backboard in the housing and a region from the vent hole of the backboard to the shutter provided to the support structure has an airtightness of vent passage structure.

In addition, for example, the shutter is provide to a guide portion (HDA guide portion) for mounting the storage unit in the region on the side on which the storage unit is mounted in the housing. The shutter opens by insertion of the storage unit, and closes by its removal.

Furthermore, the disk array device may further comprise a rectifying means located at a boundary portion between the mounted section and the unmounted section of the storage unit in the housing so that a region of the vent passage for the mounting position of the storage unit in the housing has a conduit construction independent from an adjacent region. For example, as a configuration concerning the boundary portion, it may be configured to mount dummy storage units (dummy HDDs) to the unmounted section of the storage unit which corresponds to the relevant boundary portion. In addition, it may be configured to mount a rectifying plate for a detachable attachment system on the relevant boundary portion. In addition, it may be configured to provide a rectifying plate construction similarly to the rectifying plate on the storage unit side.

In addition, it may be configured to have a construction such as a shutter not in the vicinity of the backboard surface but in the vicinity of the opening surface on the side to which the storage unit of the housing is provided for the vent hole of the backboard. In the region on the side to which the storage unit of the housing is provided, a construction such as shutter is provided in the size to cover a surface for the position to insert and detach the storage unit. The relevant shutter similarly has a mechanism for opening when the storage unit is mounted and closing when it is not mounted. A portion from the housing front surface to the backboard is made into an independent airtight conduit structure in units of portions for mounting and accommodating one storage unit. For example, it is configured to have a structure which separates each storage unit in the housing. In the vent passage in the region on the side to which the storage unit of the housing is mounted, since the area of the opening surface is adjusted by opening and closing the shutter, an effect of adjusting the volume of the cooling air can be obtained in the same manner as is the case of adjusting the open area rate of the vent hole of the backboard.

(2) A disk array device according to the present invention further comprises a control means for adjusting the volume of the cooling air in each vent passage of the housing by positively controlling the open area rate of the vent hole in accordance with the judgment of the device condition related to cooling. That is, it is a disk array device comprising a storage unit, a control unit for controlling the storage of the data in the storage unit, a power unit for supplying power to each section, a fan for venting the housing therein, a backboard for connecting each section, on one surface of which the storage is mounted via a connector, a cooling function of allowing cooling air to flow into the housing by the operation of the fan and exhaust air from the housing via vent holes provided to in the backboard, a shutter of a mechanism located against the vent hole of the backboard and whose open area rate is adjusted by opening when the storage unit is mounted and closing when it is removed, and a control means for adjusting the volume of the cooling air by controlling the open area rate of the vent hole in accordance with the judgment of the device condition related to cooling.

The control means judges the device condition by using various functions provided to the housing, for example, state monitoring of power which the power controller board possesses, state monitoring of the storage units, control of the cooling capabilities of the cooling function, and temperature monitoring of each section in the housing.

In addition, the control means is configured as a shutter opening/closing control function for controlling the opening/closing operation of the shutter. The shutter opening/closing control function comprises a physical/mechanical shutter opening/closing section which is located near the backboard and carries out the operation for adjusting the opening and closing of the shutter and a processing section for controlling the operation of the shutter opening/closing section in accordance with the judgment of the device condition. The shutter opening/closing section is provided to, for example, the back surface of the backboard, a surface of a unit to be connected to the backboard, and others.

In addition, the control means judges the power condition in the housing (device operation mode, element temperature inside the power supply, current used of each section, etc.) in the housing by the power unit as the device condition related to the cooling, and controls to adjust the volume of the cooling air in accordance with the results of the judgment. In addition, the control means controls the open area rate of the vent hole by the configuration to have the processing section in the power unit in accordance with the judgment of the device condition related to the cooling with the primary emphasis placed on the power unit.

In addition, the control means judges the device load condition (host access frequency, temperature of power unit, etc.) and the condition concerning mounting and operation of the storage unit (degree of power unit redundancy, number of storage units mounted, stopped storage unit condition, etc.) by the control unit as the device condition related to the cooling, and carries out the control to adjust the volume of the cooling air in accordance with the judgment results. In addition, the control means controls the open area rate of the vent hole by the configuration to have the processing section in the power unit in accordance with the judgment of the device condition related to the cooling with the primary emphasis placed on the power unit.

In addition, for example, as the shutter opening/closing control function, the shutter has a mechanism for making opening/closing operations on the back side of the backboard, and the shutter opening/closing section has a slide portion for making the slide operation in parallel to the backboard surface by motor control, etc., and is of a mechanism for opening and closing the shutter by the contact of the slide portion with the shutter on the back surface side of the backboard.

Furthermore, the power unit is equipped with a fan on the housing back surface side, is equipped with the shutter opening/closing section on the backboard connection surface, and has a circuit for controlling the operation of the fan and the shutter opening/closing section (fan/motor control circuit) by the control signal as the processing section.

Examples of the factor of fan rotation speed control in cooperation with the shutter opening/closing control in the housing include the following. As the control source, there are a control unit and a power unit. In the event that the control source is a control unit, control factors include the host access frequency, power temperature, degree of power unit redundancy, number of storage units mounted, stopped storage unit condition, and others. In the event that the control source is a power unit, control factors include the operation mode, element temperature inside the power supply, and the current used.

The control sources judge the above-mentioned various factors, and for example, when there is only a small number of host accesses, when the temperature is low, when the degree of power unit redundancy is large, when the number of storage unit mounted is small, when there is any stopped storage unit, when the operation mode is standby, when the element temperature inside the power supply is low, when the current used at each section is small, and others, the control sources control the fan in the housing to low rotations. In addition, the control sources control the fan to high rotation speed when the cases are reverse.

In addition, to other configurations of the present invention, for other vent hole other than the vent hole corresponding to mounting of the storage unit, a means for controlling an open area rate by opening/closing the shutter is provided. The means for controlling the other vent hole controls the volume of the cooling air of the other vent hole by controlling opening/closing of the shutter in accordance with the mounting condition of the storage unit from the storage-unit mounting side for the vent hole corresponds to the mounting of the storage unit and the other vent hole in the backboard using the means of Item (1) as described above. In addition, a means for controlling the other vent hole controls the volume of the cooling air of the other vent hole by controlling opening/closing of the shutter in accordance with the judgment of the device condition from the side of the power unit, control unit, fan, and others for the vent hole corresponds to the mounting of the storage unit and the other vent hole in the backboard using the means of Item (2) as described above.

Effects of representative ones of inventions disclosed in the present application will be briefly described as follows.

According to the disk array unit according to the present invention, drop of the cooling efficiency caused by the difference of conditions between the mounted and unmounted sections of the storage unit can be prevented, and the use of dummy storage units (dummy HDDs) in the disk array device can be reduced and/or eliminated to achieve a simple cooling system. By reducing the use of dummy storage units, effects of cost reduction and environmental load can be obtained. In addition, since the storage space for dummy storage units is no longer required, ease of use is increased.

In addition, by the means of Item (1) presented as a means for particularly solving the above-mentioned problem, the air volume adjustment is made easier by the shutter, enabling efficient cooling for the storage unit.

In addition, by the means of Item (2) presented as a means for particularly solving the above-mentioned problem, efficient cooling of each portion inside the device is possible in accordance with the device condition, which is effective as an energy-saving technique, too.

BRIEF DESCRIPTION OF THE DRAWINGS

FIGS. 1A and 1B are drawings showing the entire external appearance of the hardware configuration of a disk array system of an embodiment of the present invention, and FIG. 1A shows the front and FIG. 1B shows the rear.

FIG. 2A shows the front and FIG. 2B shows the rear.

FIG. 3A shows the front and FIG. 3B shows the rear.

DESCRIPTION OF THE PREFERRED EMBODIMENTS

Hereinafter, embodiments of the present invention will be detailed based on the drawings.

First Embodiment

A disk array system (disk array device) according to a first embodiment of the present invention controls, as a means for cooling the interior of the system, an open area rate of a vent hole by: providing a shutter corresponding to the vent hole of a backboard in a chassis (housing); and opening/closing the shutter by insertion and removal of a storage unit (HDA) into and from the chassis. By this, a volume of cooling air flowing in a vent passage in a HDA unmounted section having low flow resistance is restricted to secure the volume of the cooling air at a HDA mounted section, and controls the volume of the cooling air flowing in the whole chassis including the vent passage of the HDA unmounted section and the vent passage of the HDA mounted section.

<Configuration of Hardware in Disk Array System>

Figure 2A:
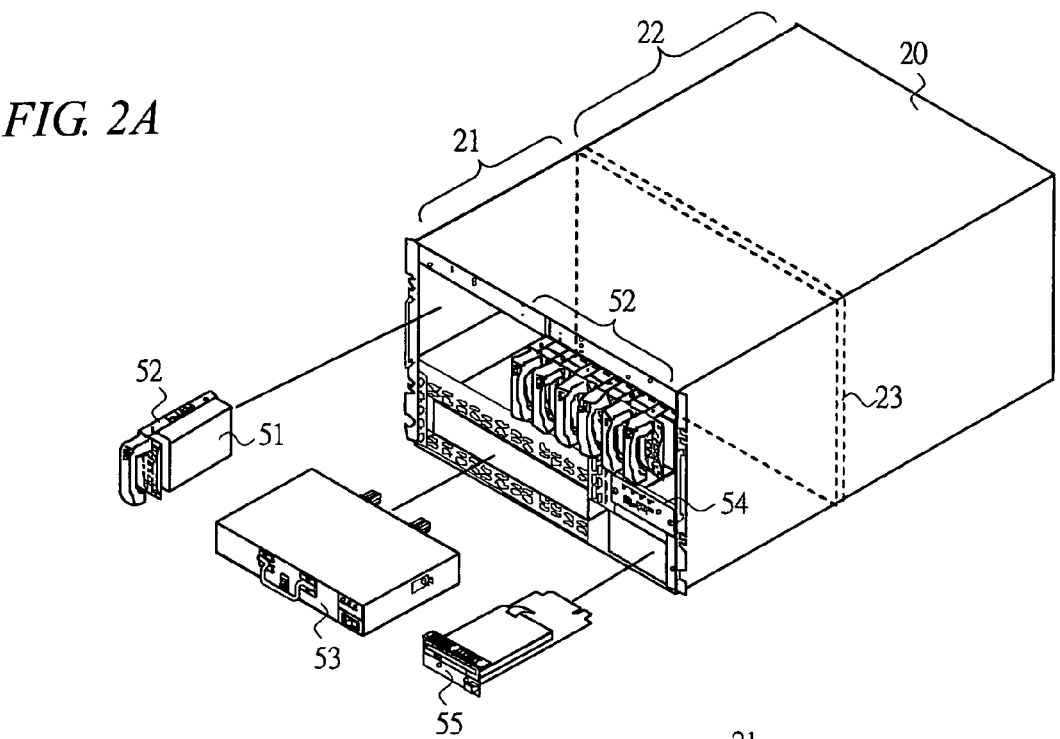
FIGS. 2A and 2B are diagrams showing a hardware appearance configuration of a basic chassis in a disk array system according to an embodiment of the present invention.
Figure 2B:
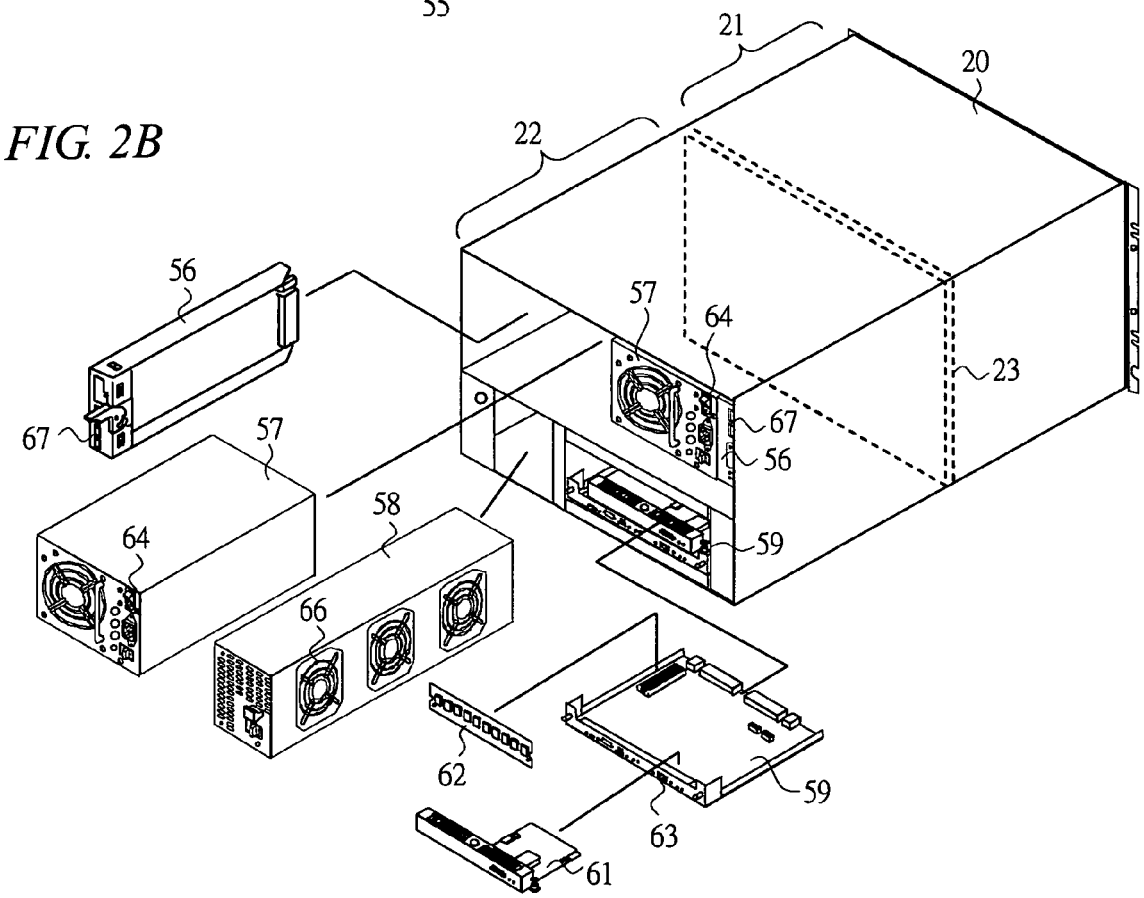
Figure 3A:
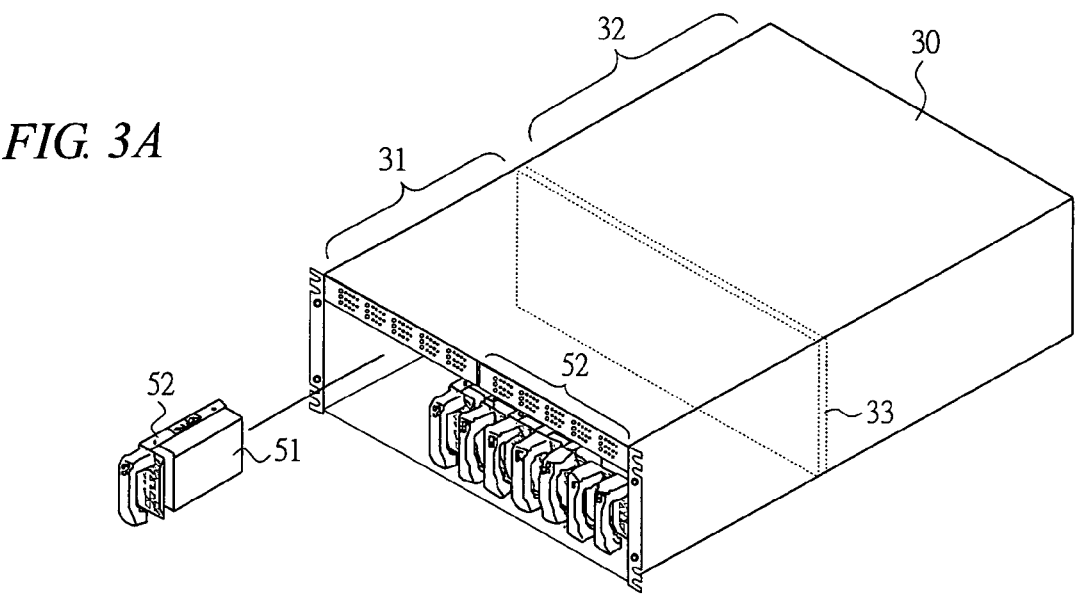
FIGS. 3A and 3B are diagrams showing a hardware appearance configuration of an extended chassis in a disk array system according to an embodiment of the present invention.
Figure 3B:
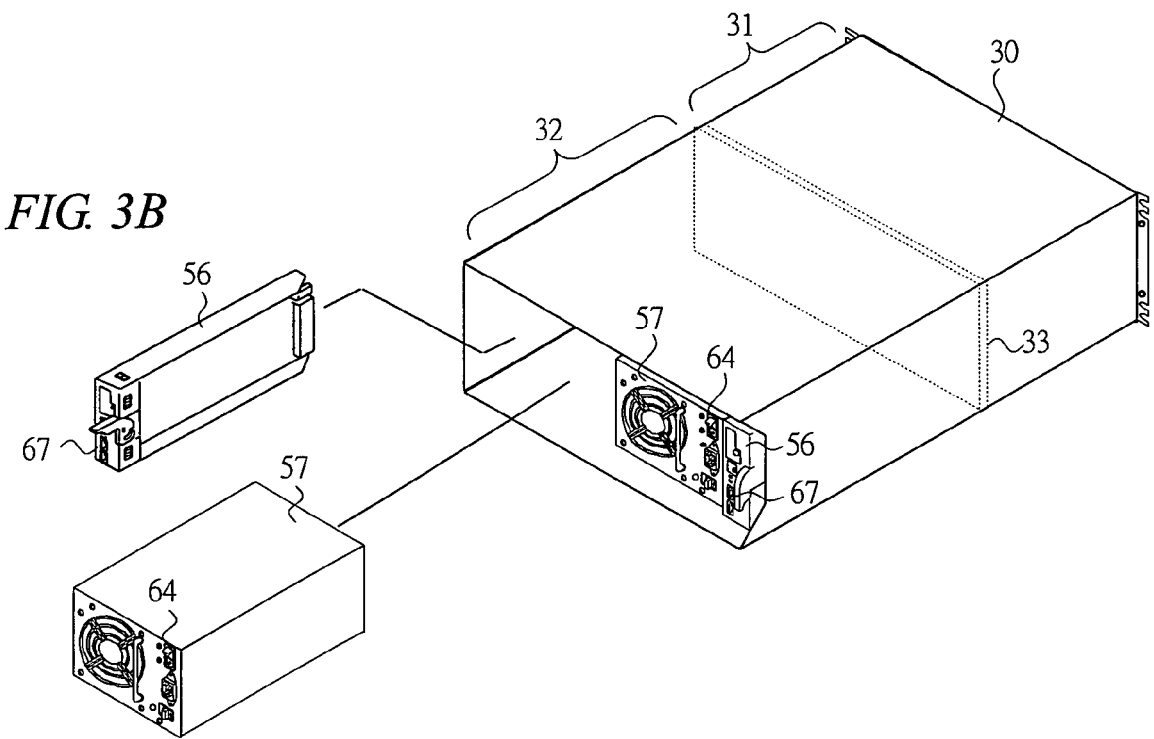

FIGS. 1A and 1B show a hardware appearance configuration of a disk array system 10 according to an embodiment of the present invention. The configuration of the disk array system 10 is common to respective embodiments of the present invention. FIG. 1A is a front view of the device and FIG. 1B is a rear view of the device. FIG. 2A and FIG. 2B show a hardware appearance configuration of a basic chassis 20 of the disk array system 10. FIG. 2A is a perspective view as seen from a front side of the chassis, and FIG. 2B is a perspective view as seen from a back side of the chassis. FIG. 3A and FIG. 3B show a hardware appearance configuration of an extended chassis 30 of the disk array system 10. FIG. 3A is a perspective as seen from a front side of the chassis, and FIG. 3B is a perspective as seen from a back side of the chassis.

In FIG. 1, the disk array system 10 is configured by a rack frame 11 used as a base. In a vertical direction of inner right and left side surfaces of the rack frame, mount frames 12 are formed in a longitudinal direction over a plurality tiers.

Along this mount frame 12, the basic chassis 20 and the extended chassis 30 are mounted in the form of drawers. The basic chassis 20 is a housing for accommodating a controller board 59 and others which comprise a control unit of the disk array system 10. The extended chassis 30 is a housing for accommodating a HDD and can be extended as occasion demands.

In the disk array system 10, one basic chassis 20 is equipped, for example, to a lower tier, and, on an upper tier, the maximum nine extended chassis 30 can be equipped. On a system front surface (device front surface), HDAs 52 described later are removably arranged in the basic housing 20 and the extended chassis 30. In addition, in the basic chassis 20, a display panel 54 and others are arranged. On a system back surface (device back surface), in the basic chassis 20 and the extended housing 30, power controller boards 56 described later and others are arranged. In the basic chassis 20, a controller board 59 that composes a control unit of the disk array system 10 is arranged, and, to the controller board 59, an information processor 300 which serves as a host is connected through a communication cable 92 and others. Through a fiber channel cable 91, the power controller boards 56 are connected to each other. This embodiment is a configuration example in which each unit in the disk array system 10 is duplicated.

Examples of the information processor 300 include a personal computer, a work station, a main frame computer, and others. The information processor 300 is equipped with: programs for utilizing the disk array system 10; communication interfaces, and others. The information processor 300 issues instructions for carrying out read, write, and others of data for a storage region which the disk array system 10 offers. The disk array system 10 processes the data in conformity to the receipt of instructions from the information processor 300.

As shown in FIG. 2 and FIG. 3, in the basic chassis 20 and the extended chassis 30, boards (circuit boards) and units which offer various functions of the disk array system 10 are mounted. The basic chassis 20 is the housing for accommodating boards and units that comprise the control unit of the disk array system 10. The extended chassis 30 is mainly the housing for accommodating a HDD (HDA 52). Each board and unit can be mounted and detached as occasion demands, such as maintenance, servicing, and others. For each housing, a vent passage for cooling each section in the device by a cooling function described later is designed.

In FIG. 2A, the basic chassis 20 is divided into a side on which the HDD is mounted and a side which is equipped with power supply, fan, and other units, by as a boundary, the backboard 23 (position shown by the dotted line) installed in the chassis. In the chassis, a region on the side on which the HDD and others are mounted is hereinafter called the front-side housing 21. A region on the side equipped with the power supply, fans, and other units in the housing is hereinafter called a back-side housing 22. As the configuration of the vent passage, cooling wind flows therein from an opening of the front surface of the front-side housing 21 and is exhausted from the opening at the back surface of the back-side housing 22. The backboard 23 mutually connecting boards and units inside the housing or a vent hole described later is mounted as part of the vent passage in which the cooling air flows from the front-side housing 21 to the back-side housing 22.

On a front upper-tier side of the basic chassis 20 (front-side housing 21), disk drive units (hereinafter, "HDAs") 52 charged with the HDD 51 are mounted on a plurality of disk drive units arranged. The region on the upper-tier side of the front-side housing 21 (HDA mounted region) has an internal construction for mounting a plurality of HDAs 52. At a mounting position of each HDA 52 (HDA mounting position) in the HDA mounted region, a guide rail etc. (HDA guide section) which corresponds to a shape of the HDA 52 is provided for inserting and removing HDA 52. In each HDA mounted position, HDA 52 can be freely mounted and removed by a maintenance personnel and others.

The whole inner wall of each of the chassis (20, 30) is covered with a sheet metal and others. In addition, though not illustrated, a configuration in which partitions for reinforcement, supports, and others as well as sheet metals and other structures are installed inside each of the chassis (20, 30) may be adopted. In addition, the present embodiment is configured to install no partitions, walls, or other structures for separating the adjacent HDAs 52 in the HDA mounted region of the front-side housing 21.

The HDA 52 is a unit (HDD assembly) integrated by installing canisters and other mechanical structures for mounting and removal to and from the housing. The HDA 52 is a unit of mounting the housing thereon. The maintenance personnel and others insert the applicable HDA 52 from the housing front to the innermost direction along the HDA guide section such as a guide rail at the HDA mounting position and connect the connector section of the HDD 51 of the HDA 52 to the connector section provided in the backboard 23 to bring the housing to the HDD mounted condition when the HDA 52 is installed. Conversely, when the HDA 52 is removed, the applicable HDA 52 is pulled out to the near side along the HDA guide such as a guide rail, etc. at the HDA mounted position of the housing to bring the housing to the HDD unmounted condition.

In addition, on the front lower tier side of the basic chassis 20, a battery unit 53, a display panel 54, and a flexible disk drive 55 are mounted. To the battery unit 53, a rechargeable battery is built in, and in the event that the power supply is interrupted from AC/DC power unit 57 described later due to power failure or others, it functions as backup power supply for supplying power to each board and unit. The display panel 54 displays the operating condition of HDD 51 and has a display device such as an LED lamp, etc. provided for display. The flexible disk drive 55 is used when a maintenance program is loaded into the board.

In FIG. 2B, on the back upper tier side of the basic chassis 20, a power controller board (also called a housing controller board and others) 56, AC/DC power supply 57, a cooling fan unit 58, a controller board 59, and others are connected.

On both side surfaces of the back surface upper tier side of the basic chassis 20, the power controller board 56 is mounted one by one. The power controller board 56 is communicably connected to a plurality of HDDs 51 in each chassis (20, 30) by a loop-form communication pathway, such as a communication pathway for communicating in an FC-AL system (topology). The power controller board 56 is mounted with circuits which carry out state monitoring of the AC/DC power control and the HDD 51, and carry out control of power supply to the HDD 51, control of cooling capabilities of the cooling function, control of the display device on the display panel 54, temperature monitoring of each section inside the housing, and others. The cooling function (cooling device) is a function to cool the inside of the disk array system 10 or each chassis (20, 30), and is, for example, an intercooler, heat sink, an air-cooled cooling fan, and others. In the case of the present embodiment, in the cooling function, air-cooling by operation control of the cooling fan, shutter control described later, etc. are primarily included. To the power controller board 56, a connector 67 for a fiber channel cable 91 is installed, and the basic chassis 20 and the extended chassis 30 are connected via the fiber channel cable 91.

To the spacing held between two power controller boards 56 in the back surface upper tier side, two power units 57 are mounted in a row. The power unit 57 is a unit in which the AC/DC power supply is built in, and supplies the power to each HDD 51, each board, and unit, and others. The power unit 57 is connected to the power controller board 56 and is set to supply the power supply to each HDD 51 by signals from the power controller board 56. To the power unit 57, a breaker switch 64 is mounted for turning ON and OFF the output of the AC/DC power supply. In addition, the power unit 57 is equipped with the cooling fan located on the housing back surface, and constitutes a cooling function in combination with the cooling fan unit 58.

By the way, in the present embodiment, in order to obtain security concerning the power supply of the basic chassis 20 and the extended chassis 30, it is configured to redundantly mount respective two power controller boards 56 and power units 57 onto the basic chassis 20 and the extended chassis 30. The configuration is not limited to this and may be configured to mount respective one power controller board 56 and power unit 57.

On the back surface lower tier side, to the lower part of the power unit 57, an air-cooled cooling fan unit 58 is installed. To the cooling fan unit 58, one or more cooling fans 66 are mounted. The cooling fan 66 takes away from heat generated from the HDD 51, the power unit 57, and others to the outside of the housing by introducing and exhausting the cooling air into and from the housing by its operation. In the basic chassis 20 and the extended chassis 30 and boards and units installed to these, vent passages for circulating air inside the housing are formed. It is designed to efficiently exhaust heat inside the housing to the outside by the cooling fan 66 through vent passages. With respect to the cooling fan 66, it may be installed to each HDD 51 but since the number of chips and units can be reduced, in the present embodiment, a large cooling fan 66 is installed to every housing.

The cooling fan unit 58 is connected to a controller board 59 or the power controller board 56 by a control line, and the rotating speed of the cooling fan 66 of the cooling fan unit 58 is controlled by the controller board 59 or the power controller board 56 through this control line.

On the bottom tier side of the back surface, two controller boards 59 are mounted. To the controller board 59, communication interface function between HDD 51 mounted to the basic chassis 20 and the extended chassis 30, control of the operation of HDD 51, for example, control by RAID system, circuits for monitoring the HDD 51 state, and others are mounted. By the way, in the present embodiment, it is configured to allow the power controller board 56 to carry out control of power supply to the HDD 51, control of cooling capability of cooling function, and others, but it may be configured to allow the controller board 59 to carry out these controls.

In addition, the controller board 59 is mounted with a communication interface board 61 equipped with the communication interface function to communicate with the host information processor 300, cache memory 62, and others. The communication interface board (also called a host interface board, channel adopter, and others) 61 provides communication functions in, for example, SCSI and fiber channel standard. The cache memory 62 is a memory used for temporarily storing the read/write data, etc. primarily to HDD 51. The communication function shall not be limited to these forms but the communication interface board 61, cache memory 62, and others may be mounted as boards separate from the controller board 59.

To the communication interface board 61, as an external connector 63 for connecting to the information processor 300, SAN (Storage Area Network) built by a fiber channel protocol, LAN (Local Area Network) built by a protocol such as Ethernet (registered trademark), or an external connector which comply with the specified standards such as SCSI and others is mounted. The disk array system 10 is connected to the information processor 300 via a communication cable 92 connected to this external connector 63.

By the way, in the present embodiment, in order to secure the security concerning the control of HDD 51 of the basic chassis 20, a configuration to redundantly mount two controller boards 59 is adopted. The configuration shall not be limited to this but a configuration to mount one controller board 59 only may be adopted.

In FIG. 3, same as the basic chassis 20, the extended chassis 30 is separated into a region on the side to which HDD is installed (hereinafter called the front-side housing 31 and a region on the side to which units such as power supply, fan, and others are installed (hereinafter called the back-side housing 32) with the backboard 33 installed in the housing (the position shown in the dotted line) used as a boundary. The backboard 33 mutually connects each section and a vent hole described later is installed, which serves as part of the vent passage that allows cooling air to flow from the front-side housing 31 to the back-side housing 32.

On the front side of the extended chassis 30, same as in the case of basic chassis 20, a plurality of HDAs 52 with HDD 51 charged are installed in a row. To the back-side of the extended chassis 30, the power controller board 56, power unit 57, and others are connected. On both sides of the back surface of the extended chassis 30, one piece each of power controller board 56 is installed. In addition, to the space between two power controller boards 56, two power units 57 are installed in a row.

In the present embodiment, same as the basic chassis 20, in order to secure the security concerning the power supply of the extended chassis 30, a form to redundantly install two units each of the power controller board 56 and the power unit 57 to the extended chassis 30 is adopted. The form shall not be limited to this but a form to install one unit each of the power controller board 56 and the power unit 57 may be adopted. In addition, a form to mount functions such as power control of HDD 51, cooling capability control of cooling function, and other functions which the power controller board 56 of the extended chassis 30 is equipped may be adopted to the controller board 59 of the basic chassis 20.

HDD 51 connected to each chassis (20, 30) are storage unit equipped with, for example, a Contact Start Stop (CSS) system 3.5-inch size magnetic disk, a load/unload system 2.5-inch size magnetic disk, and others. The 3.5-inch size magnetic disk is a storage unit which has, for example, SCSI1 (Small Computer System Interface 1), SCSI2, SCSI3, FC-AL (Fiber Channel-Arbitrated Loop), parallel ATA (AT Attachment), serial ATA, and other communication interfaces. Similarly, the 2.5-inch size magnetic disk is a storage unit which has, for example, parallel ATA, serial ATA, and other communication interfaces.

In the event that a 2.5-inch size magnetic disk is accommodated in the chassis (20, 30) as an HDA 52, the 2.5-inch size magnetic disk may be accommodated in a container with a 3.5-inch form. This can improve the impact proof-strength performance of a magnetic disk. By the way, the 2.5-inch size magnetic disk and 3.5-inch size magnetic disk not only differ in the communication interface but also differ in I/O performance, power consumption, length of life, and others. The 2.5-inch size magnetic disk does not provide superior performance in I/O performance to the 3.5-inh size magnetic disk and provides shorter life, but is superior in small power consumption.

<Functional Block Configuration of Disk Array System>

Figure 4:
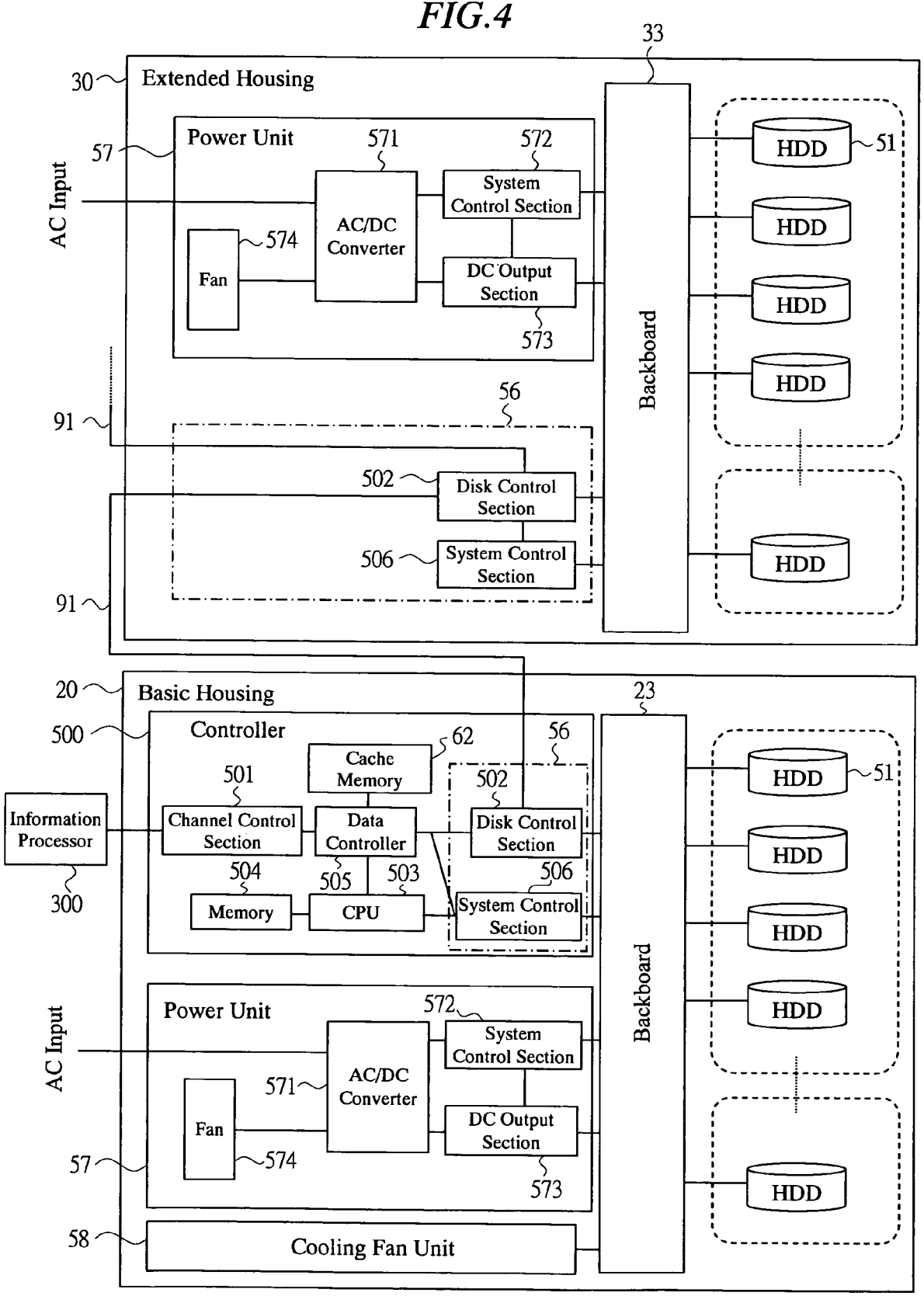
FIG. 4 is a diagram showing a functional block configuration of a disk array system according to an embodiment of the present invention.

FIG. 4 is a diagram indicating a functional block configuration of a disk array system 10 of each embodiment. To a controller 500 of the basic chassis 20 of the disk array system 10, the information processor 300 is connected via SAN and others. The disk array system 10 has a configuration to connect the basic chassis 20 to the extended chassis 30 with a fiber channel cable 91 via the power controller board 56 shown by dotted line frame.

The basic chassis 20 comprises a controller 500, power unit 57, cooling fan unit (fan assembly) 58, backboard 23, detachable HDD 51 (HDA 52), and others. Via the backboard 23 and a connection line (bus), a disk control section 502 and system control section 506 for the controller 500, system control section 572 and DC output section 573 of the power unit 57, cooling fan unit 58, each HDD 51, and others are connected.

The controller 500 comprises a channel control section 501, disk control section 502, CPU 503, memory 504, cache memory 62, data controller 505, system control section 506, and others. The controller 500 is mounted to the controller board 59.

The instructions for read, write, and others of the data issued from the information processor 300 to the disk array system 10 are received by the channel control section 501 of the controller 500. The channel control section 501 is mounted to the communication interface board 61. CPU 503 administers the controller 500, executes the control program using memory 504, and achieves various functions. The data controller 505 is a data processing circuit for processing data I/O control and others between the host (300) and HDD (51) by being connected to the channel control section 501 and the disk control section 502 and using the cache memory 62. The cache memory 62 is used for temporarily holding the data to be processed.

The power controller board 56 has a configuration to contain the disk controller section 502 and the system control section 506. The disk control section 502 executes the data read/write and others to HDD 51 in compliance with the communication with the data controller 505. The disk control section 502 has access to a plurality of HDDs (RAID group) when RAID control is conducted. The disk control section 502 is connected communicably with the disk control section 502 of other housing through the control line (fiber channel cable 91). The system control section 506 is a circuit to process system control such as state monitoring of AC/DC power supply equipped in the housing, control related to cooling functions using the cooling fan unit 58, etc. on the basis of the control of data controller 505 and CPU 503.

The power unit 57 comprises an AC/DC converter 571, system control section 572, DC output section 573, and fan 574. The AC/DC converter 571 is part equipped with the AC/DC power supply, and based on the original AC input, it converts the input to DC output. The system control section 572 is a circuit which caries out system control related to power supply such as control of power supply to HDD 51, etc. on the basis of the communication with each section inside the housing through the backboard 23 and the control line. The DC output section 573 supplies the DC output from the AC/DC converter 571 to teach section inside the housing through the backboard 23. The fan 574 is built in particularly for efficient cooling to the power unit 57, and exhausts cooling wind to the housing back surface by its action.

The cooling fan unit 58 is connected to the backboard 23 through the control line, and based on signals from the controller 500 or power unit 57, control concerning rotation of the built-in fan 66 is conducted.

In addition, the extended chassis 30 comprises the power controller board 56, a power unit 57, a backboard 33, a detachable HDD 51 (HDA 52), and others. Via the backboard 33, the disk control section 502 and system control section 506 of the power controller board 56, the system control section 572 and the DC output section 573 of the power unit 57, each HDD 51, and others are connected.

The power controller board 56 of the extended chassis 30 has a configuration containing the disk control section 502 and the system control section 506 same as the power controller board 56 of the basic chassis 20. The disk control section 502 of the extended chassis 30 is communicably connected to the disk control section 502 of the basic chassis 20 and other extended chassis 30 through the fiber channel cable 91. The system control section 506 of the extended chassis 30 is a circuit for processing system controls such as state monitoring and others of AC/DC power supply and HDD 51 installed inside the housing.

The power unit 57 of the extended chassis 30 carries out control related to power supply inside the housing same as the power unit 57 of the basic chassis 20. That is the system control section 572 carries out control related to power supply such as control, etc. of power supply to HDD 51 based on the communication with each section in the housing through the backboard 33 and the control line. The DC output section 573 supplies DC outputs from the AC/DC converter 571 to each section inside the housing through the backboard 33. The fan 574 exhausts cooling air to the housing back surface by its action.

<Vent Passage and Cooling Air>

Figure 5:
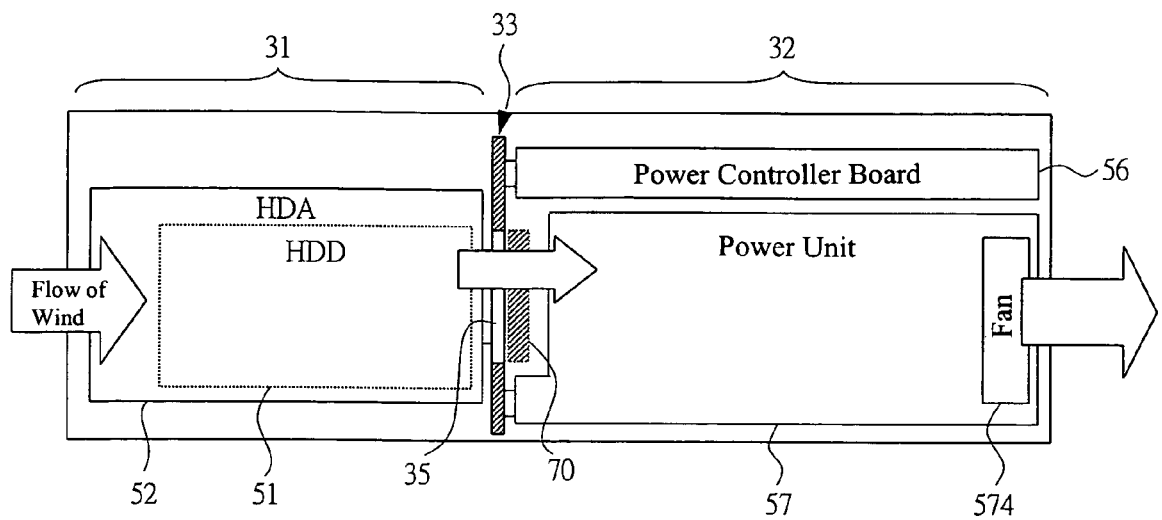
FIG. 5 is a sectional view taken in a perpendicular direction of a chassis and shows a construction related to a vent passage for cooling the hosing in a disk array system according to an embodiment of the present invention.
Figure 6:
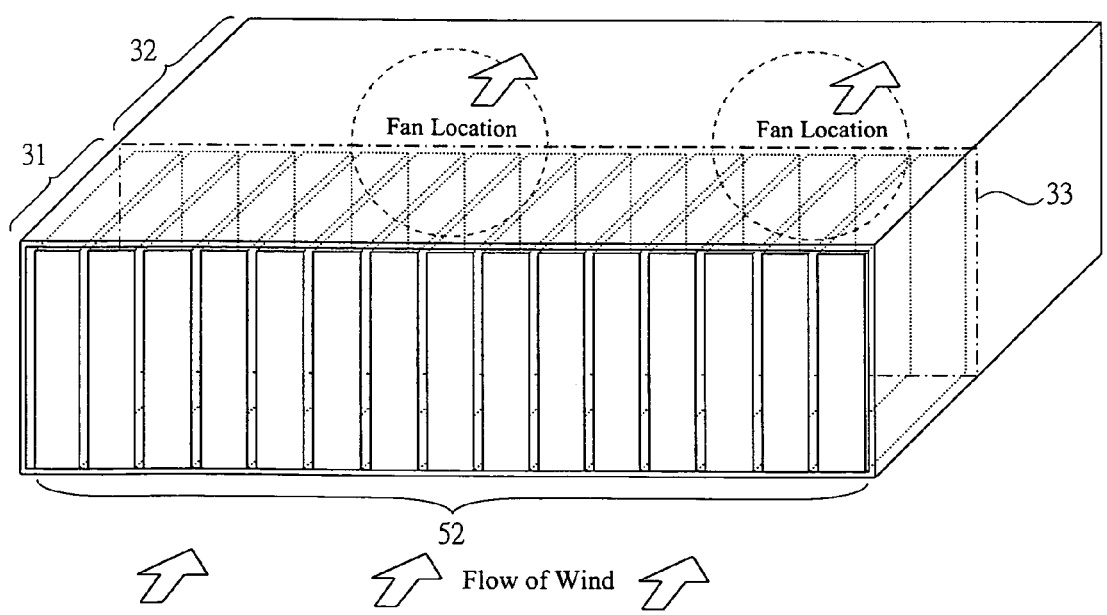
FIG. 6 is a perspective view as seen from a front surface of a chassis and shows a construction related to a vent passage for cooling the housing in a disk array system according to an embodiment of the present invention.
Figure 7:
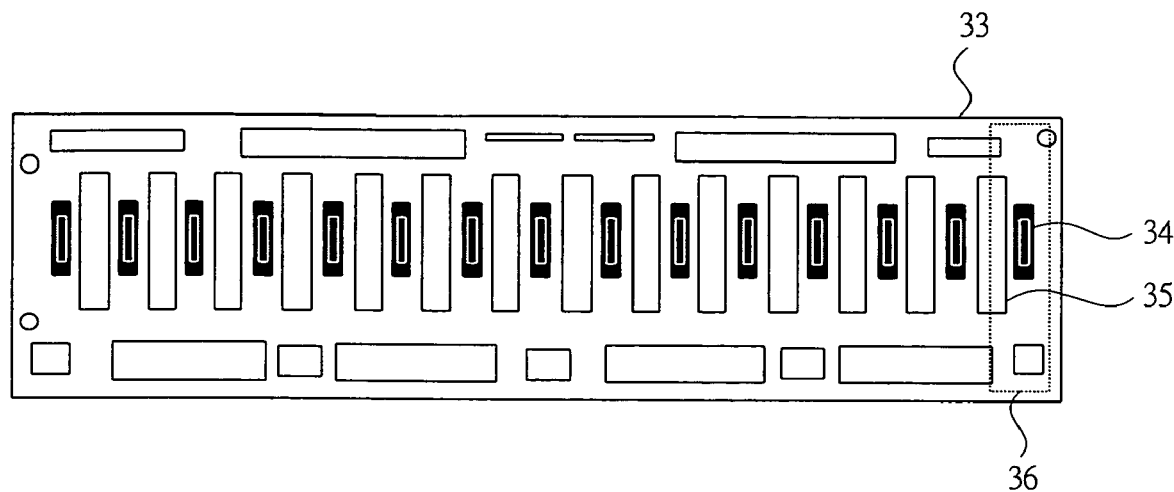
FIG. 7 is a layout example of a backboard in a disk array system according to an embodiment of the present invention.

FIG. 5 is a diagram indicating the construction related to the vent passage for cooling in the chassis (20, 30) of the disk array system 10. It indicates the cross-section in the perpendicular direction of the housing side surface and a vent hole. In particular, it schematically shows the tier to which HDA is installed in the extended chassis 30. Now, in the present embodiment, the characteristic cooling means is described using the extended chassis 30, but this is same in the case of the HDA installed region of the basic chassis 20. FIG. 6 is a perspective view as seen from the front surface of the chassis (30) related to the vent passage. FIG. 7 shows a layout example in the backboard 33.

In FIG. 5, in the cross-section of the front-side housing 31 located on the left side, the condition in which HDA 52 is installed is shown. HDA 52 is connected to the backboard 33 via the connector section. In the cross-section of the back-side housing 32 located on the right side, the condition in which the power controller board 56 and the power unit 57 are connected via a connector section to the backboard 33 is shown. On the housing back surface side of the power unit 57, a built-in fan 574 is arranged. On part of the surface of the backboard 33, the vent hole 35 which serves part of a vent passage through which cooling air passes is provided. And at the position for the region of the vent hole 35 of the backboard 33, the shutter 70 for opening and closing the relevant vent hole 35 is provided.

In FIG. 6, the mounting position and cooling air flow are shown in the front-side housing 31, when a plurality of HDA 52 are all installed. The example is a configuration in which 15 pieces of HDA 52 can be installed in parallel. In addition, in the back-side housing 32, the fan position is shown with a dotted line in the back surface. The relevant fan is, for example, a fan 574 built in the power unit 57. From the opening section of the front surface of the front-side housing 31, that is, the portion free of HDA 52 in the surface on which HDA 52 is inserted and removed, that is, HDA unmounted section and a clearance between HDA 52 and the housing, cooling air flows in the housing. The inflow cooling air flows into the back-side housing 32 after passing the opening section 35 of the backboard 33, and is exhausted from the opening section on the back surface of the back-side housing 32, that is, the fan position.

In FIG. 7, on the front side of the backboard 33, a plurality of pairs of the connector 34 and the vent hole 35 are provided in a layout that corresponds to the mounted position of each HDA 52. The connector 34 is used for connecting HDD 51 (HDA 52) to the backboard 33. The vent hole 35 is provided for cooling HDD 51 and inflow of cooling air to the back-side housing 32. In addition, to the top section, bottom section, and others of the backboard 33, other vent holes than those mentioned above and connectors, etc. are provided. As one example of the layout, one HDA 52 is installed for one pair of connector 34 and vent hole 35. Reference numeral 36 shown with a dotted frame indicates one HDA mounted position and the corresponding HDA connection surface.

FIG. 8 is an explanatory view for showing flow of the cooling air in accordance with the HDA mounting condition in the housing, in the disk array system using a technique premised on the present invention, that is, using a dummy HDD in comparison to the disk array system 10 according to the embodiment of the present invention. FIG. 9 is an explanatory view for a relation between the volume and flow velocity of cooling air for HDD mounting condition and unmounted condition to the housing in the prerequisite technique of the present invention and the present embodiment.

Figure 8A:
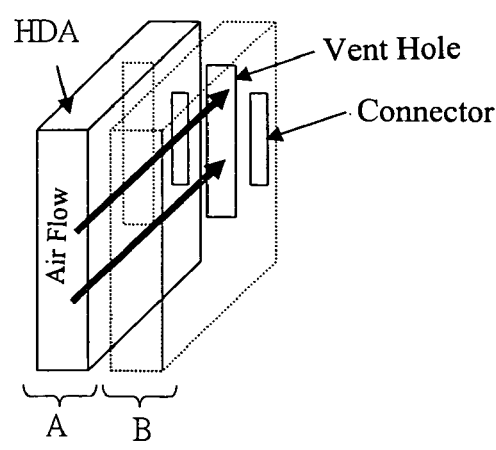
FIG. 8A is an explanatory view for showing flow of cooling air depending on a HDA mounted condition of a housing in a disk array system to be a technique premised on the present invention.

FIG. 8A shows, in the technique to be premised, flow of cooling air when the HDAs are installed adjacent to each other in the housing. It is the condition in which HDA is installed to a region (B) adjacent to a region (A) of the HDA which is connected to a backboard connector and mounted in the housing. Under the condition in which the adjacent HDAs are installed in this way, the cooling wind as shown by an arrow mark flows from the clearance of the mounted HDA in the housing front and passes the backboard vent hole.

Figure 8B:
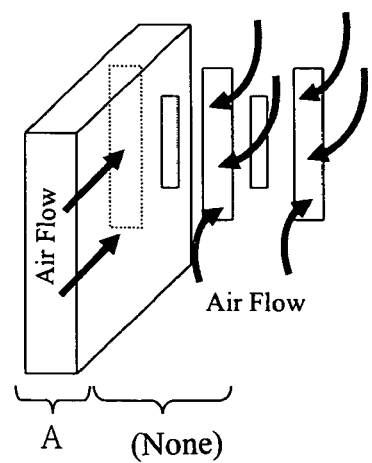
FIG. 8B is an explanatory view for showing flow of cooling air depending on a HDA unmounted condition of a chassis in a disk array system to be a technique premised on the present invention.

FIG. 8B shows, in the technique to be premised, flow of cooling air when there is an HDA unmounted section in the housing. It is the condition in which no HDA is mounted in the region adjacent to the region (A) with the HDA mounted in the housing. Under the condition in which there is an HDA unmounted section in this way, the volume increases because the flow resistance is small at the HDA unmounted section. In addition, in connection with this, on the HDA mounted section side, the volume of the cooling air relatively decreases because the air wraps around on the HDA mounted section side.

Figure 9A:
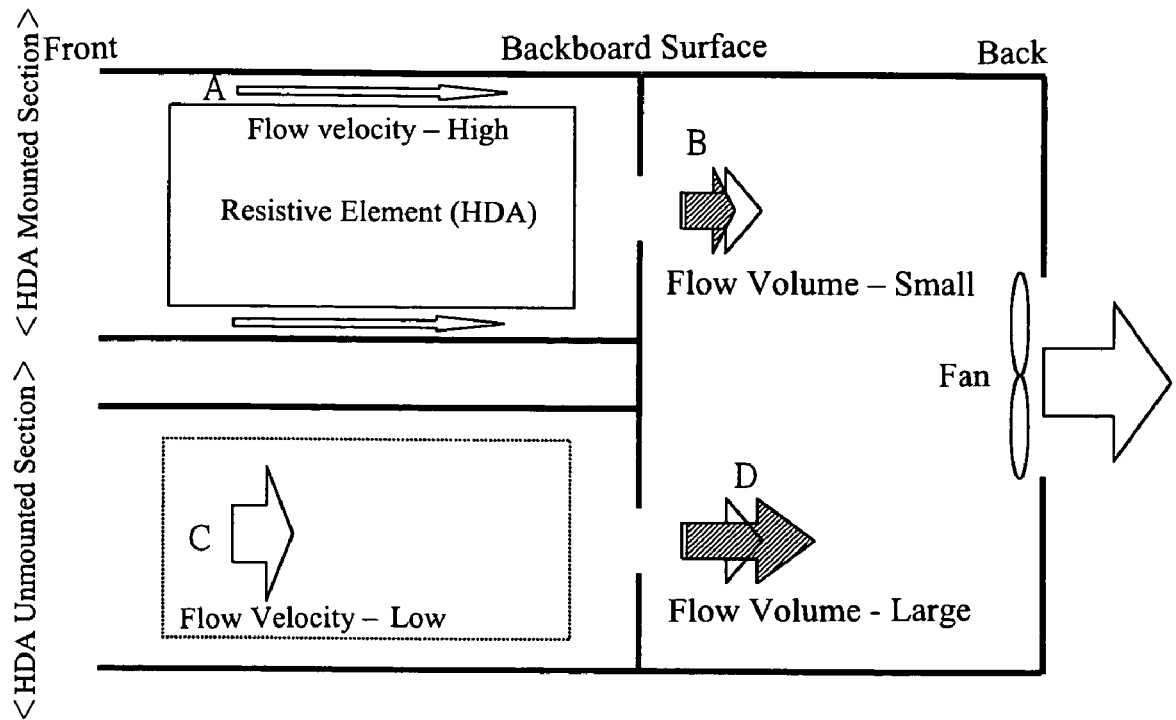
FIG. 9A is an explanatory view for showing a relation between a volume and a flow velocity of cooling air corresponding to a HDD mounted/unmounted condition onto a chassis in a technique premised on the present invention.

FIG. 9A is, in the technique to be premised, a model showing a relation between the volume and the flow velocity of the cooling air inside the housing under the condition in which the HDA is mounted on the housing and under the condition in which the HDA is not mounted on the housing. It is a sectional view taken in a horizontal direction of the housing. One left side of FIG. 9A shows a model having a vent passage and flow velocity of the cooling air in a portion in which one HDA is mounted in the housing. The other left side thereof shows a model having a vent passage and flow velocity of the cooling air in a portion in which no HDA is unmounted in the housing. A right side thereof shows a model in which the cooling air that flows from each HDA mounted position to the back side of the housing via the vent hole of the backboard is exhausted from the fan on the housing back surface. In the premised technique, in a disk array system configured to arrange the HDDs on one surface of the housing via the backboard inside the housing and to arrange a fan and power supply and other units on the other surface, each section inside the device including the HDD is cooled by allowing the cooling air to flow therein and exhausting it from the fan through the vent holes provided in the region, on which the HDD is mounted, and in the backboard by action of the fan.

In the vent passage in the HDA mounted section, the HDA serves as a resistor to the cooling air. Consequently, in the vent passage in which this HDA exists, the conduit sectional area decreases and the flow velocity of the cooling air increases as shown by the arrow mark A at a clearance section other than the HDA. In addition, because large flow resistance is created, the volume to the back side of the housing decreases due to pressure loss as shown by the arrow mark B. On the other hand, in the vent passage in the HDA unmounted section, the flow velocity of the cooling air becomes small as shown by the arrow mark C because there is no resistive element by the HDA. In addition, the volume to the back side of the housing increases as shown by the arrow D (shaded section) because the flow resistance is small.

In the case where the same resistors, that is, the mounted HDAs exist in vent passages at all the multiple HDA mounted positions in the housing (all mounted condition), as shown by the arrow marks B and D (white section), balance is achieved in such a manner that the identical volume and flow velocity of the cooling air are obtained in each vent passage. In such event, as the number of HDAs mounted increases, only the fan efficiency for exhausting the cooling air lowers.

However, in the event that there is any presence or absence of resistive elements in each vent passage of the housing, that is, the mounted/unmounted sections of the HDA are mixed, the volume of the cooling air from the vent passage having lower flow resistance increases to lower pressure. Consequently, the volume of the vent passage having relatively high flow resistance decreases and the flow velocity decreases, too. Consequently, the volume required for the HDD cooled in the HDA mounted section is not obtained, so that the volume is degraded and the cooling efficiency and the HDD temperature is increased. As the measures for these, in the premised technique, by aligning the ventilation conditions and the HDA mounted section by mounting the above-mentioned dummy HDDs to the HDA unmounted section, the volume of the cooling air in each vent passage of the housing is balanced to the same degree and the cooling efficiency is thereby secured.

Figure 9B:
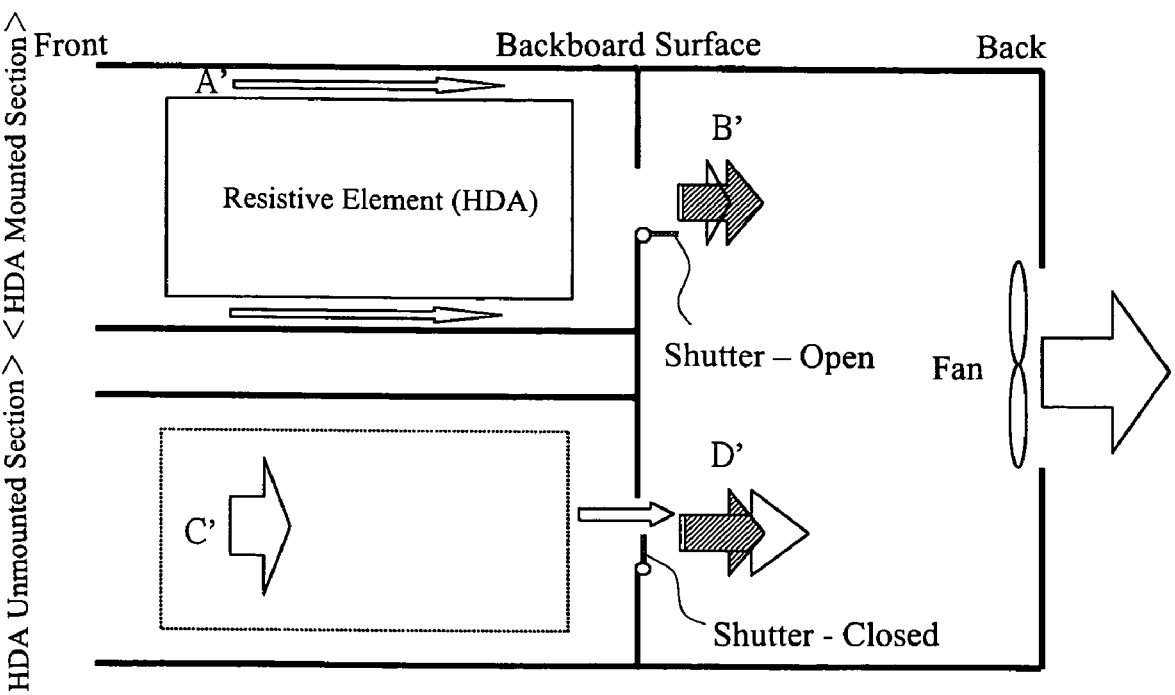
FIG. 9B is an explanatory view for showing a relation between a volume and a flow velocity of cooling air corresponding to a HDD mounted/unmounted condition onto a chassis in an embodiment of the present invention.

On the other hand, FIG. 9B shows a model of the vent passage and the cooling air in the disk array system 10 of the present embodiment. In the present embodiment, the volume of the cooling air of each vent passage is balanced by opening and closing the shutter 70 installed correspondingly to the vent hole 35 of the backboard 33. The shutter 70 is a mechanism for opening the shutter by insertion of the HDA 52, holding the vent hole open in the HDA mounted state, closing the shutter through detachment of the HDA 52, and holding the condition of closing the vent holes in the HDA unmounted state. By adjusting the open area rate of the vent hole 35 by opening and closing of the shutter 70 by the insertion and detachment of the HDA 52, the volume (arrow mark D') of the vent passage of the HDA mounted section and the volume (arrow mark B') of the vent passage of the HDA unmounted section are balanced. That is, the volume of the cooling air which flows in the vent passage having no HDA 52 that serves as a resistive element and having low flow resistance is restricted as shown by the arrow mark D' (shaded section) and the volume of the cooling air which flows in the vent passage having the HDA 52 which serves as a resistive element and having relatively high flow resistance is secured as shown by the arrow mark B' (shaded section). In this way, by balancing the volume of the cooling air in each vent passage of the housing, the cooling efficiency is stable.

Figure 10:
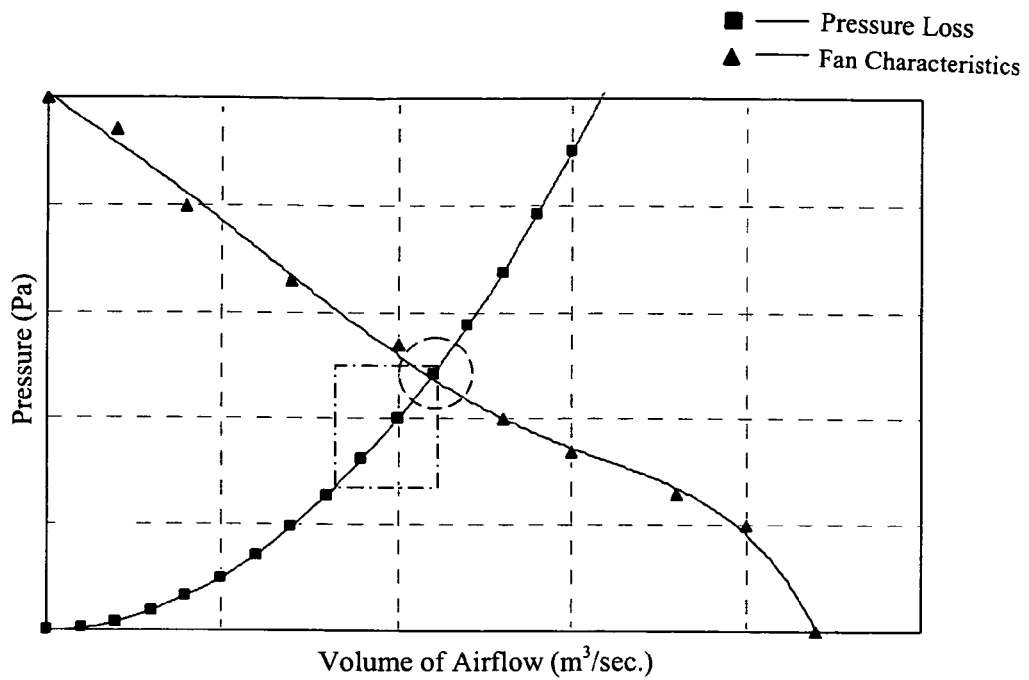
FIG. 10 is a graph showing a relation between a volume of cooling air and pressure corresponding to a condition of mounting a plurality of HDDs in a chassis of a disk array system to be a technique premised on the present invention.

FIG. 10 is a graph showing the relation between volume and pressure of the cooling air, which correspond to a condition related to mounting of a plurality of HDDs (HDAs) in the housing of the disk array system of the technique to be premised. Solid square points indicate the system pressure loss in accordance with the HDD mounted and unmounted conditions in the HDD mounted position. Solid triangle points indicate the fan characteristics corresponding to the volume of the cooling air. As shown by the two curves, as the HDDs are mounted, the pressure loss increases and the volume of the cooling air at the HDD mounted section decreases and the cooling efficiency lowers. The point shown by the circle section indicates the system pressure loss and fan characteristics in all the HDD mounted conditions in which all the multiple HDDs are mounted into the housing. The point shown by the square frame section indicates that in the condition in which the HDD unmounted sections are present (when the HDD mounted section and unmounted section are mixed), the pressure loss becomes smaller than that in all the HDD mounted conditions and the volume of the cooling air at the HDD mounted section decreases.

In the disk array system 10 of the present embodiment, the point shown by the round section is set as a target control point. Even in the condition with the HDD unmounted sections, by carrying out opening and closing the shutter, the pressure loss in the HDD unmounted section is increased and the pressure and the volume of the cooling air at the HDD mounted section are kept to variations within a specified level. By this, the cooling efficiency in the condition in which the HDD mounted section and unmounted section are mixed becomes equivalent to or higher than the cooling efficiency in the condition in which all the HDDs are installed.

<Shutter Construction>

Figure 11:
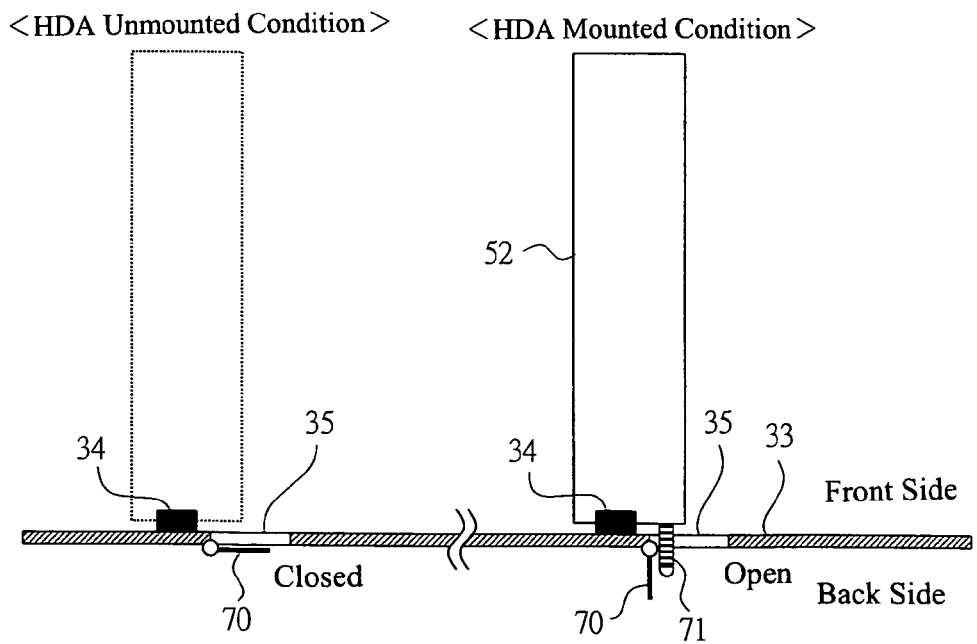
FIG. 11 shows a construction of a shutter provided in a chassis in a disk array system according to a first embodiment of the present invention and is a sectional view taken in a horizontal direction of a condition of the shutter of a HDA mounted/unmounted section in the housing.
Figure 12A:
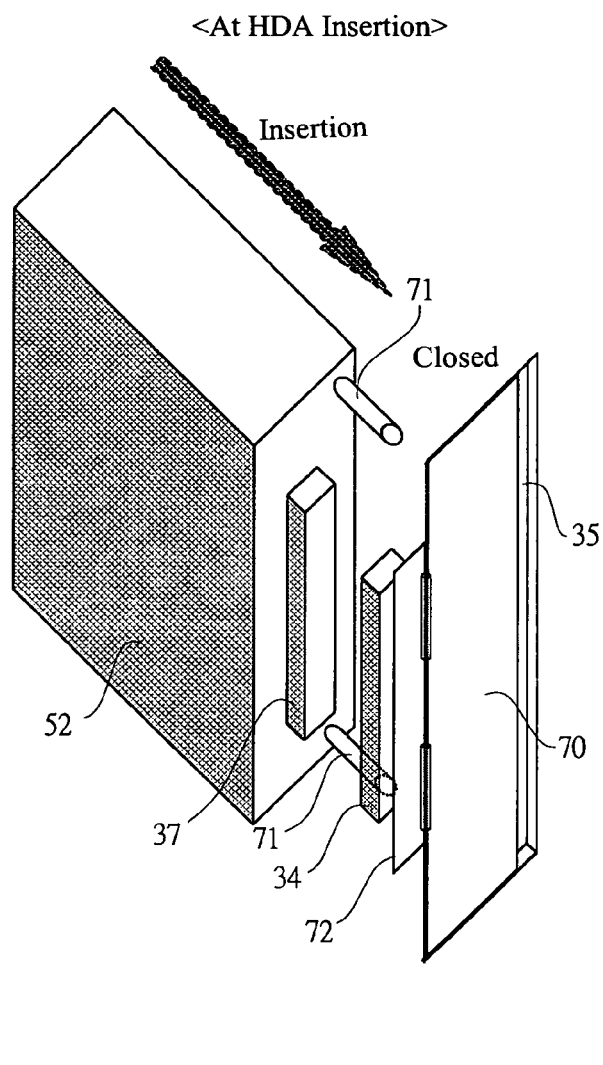
FIG. 12A shows a construction related to a shutter provided in a chassis in a disk array system according to a first embodiment of the present invention and is a perspective view as seen from a back surface side of the chassis to indicate the shutter condition at a time of insertion of the housing into a HDA.
Figure 12B:
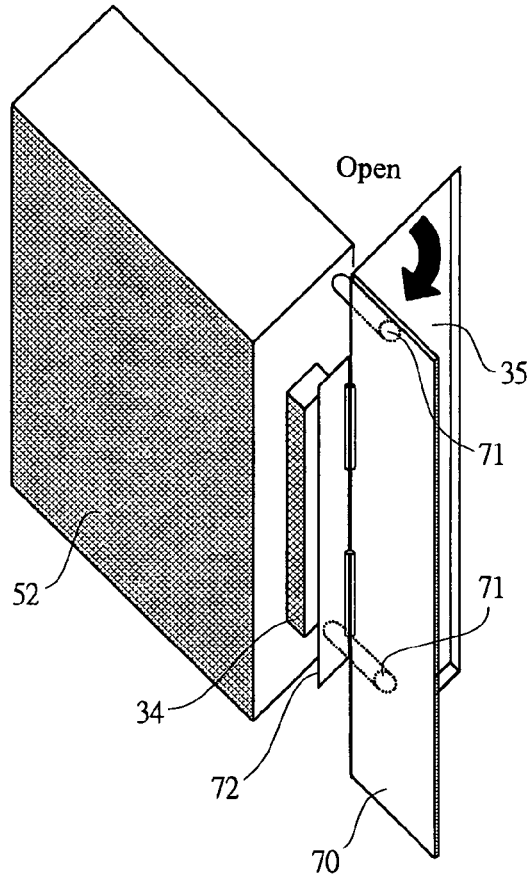
FIG. 12B shows a construction related to a shutter provided in a chassis in a disk array system according to a first embodiment of the present invention and is a perspective view as seen from a back surface side of the chassis to indicate the shutter condition at a time of connection of a HDA to the housing.

FIG. 11 and FIG. 12 show a construction concerning the shutter 70 to be mounted in the housing in the disk array system according to the first embodiment of the present invention. The first embodiment is in the form in which the shutter 70 is particularly installed directly to the portion of the vent hole 35 on the back surface side of the backboard 33 as against the vent hole 35 of the backboard 33. FIG. 11 is a sectional view taken in a horizontal direction, which indicates a condition of the shutter 70 in the HDA mounted/unmounted section in the housing. The left side of FIG. 11 indicates a condition of the shutter 70 in the HDA unmounted condition. The right side thereof indicates a condition of the shutter 70 in the HDA mounted condition. FIG. 12A is a perspective view as seen from the back surface side of the housing and indicates the condition of the shutter 70 when the HDA is inserted. FIG. 12B is, similarly thereto, a perspective view of the housing and indicates the condition of the shutter 70 when the HDA is attached in the housing. Note that FIGS. 12A and 12B show a portion around the vent hole 35 in the back surface of the backboard 33, wherein the HDA 52 is shown in smaller size.

In FIG. 11, on the front side of the backboard 33, the connector 34 for HDD connection and the vent hole 35 are installed in a pair with respect to the installation position of each HDA 52. On the back surface side of the back board 33, the shutter 70 is directly installed with respect to the vent hole 35. The shutter 70 is a means for physically controlling the open area rate of the vent hole 35 by the mounted/unmounted condition of the HDA 52 and is a mechanism for opening and closing the shutter in the form of the door in the first embodiment. In first embodiment, the shutter 70 holds an opening/closing angle as an opening/closing state. The shutter 70 operates by the action of pull-out and put-in (insertion and detachment) of the HDA 52 in the housing. As the mechanism for this, in the first embodiment, on the HDA 52 side, a pin 71 is equipped as a structure for opening and closing the shutter 70.

The shutter 70 is one means for controlling the opening area of the vent hole 35, and is not particularly limited to a door-form mechanism. For example, a mechanism for varying the open area rate of the vent hole 35 by sliding the shutter in parallel to the plane of the backboard 33 or others may be adopted.

In the HDA unmounted condition, the shutter 70 maintains the maximum closed condition (fully closed condition). In the fully closed condition, the plane of the shutter 70 is, for example, 0° with respect to the plane of the vent hole 35. In addition, as described later, the area and the mounting position of the shutter 70 are designed so that the vent hole 35 is not fully closed even if, in the fully closed state of the shutter 70, part of the open area thereof is left.

In the HDA mounted condition, the shutter 70 holds the maximum open state (fully opened state). In the fully opened state, the plane of the shutter 70 becomes, for example, 90° to the plane of the vent hole 35. The HDA 52 inserted along the HDA guide section such as a guide rail from the specified HDA insertion position of the housing front surface is connected to the connector 34 of the backboard 33 and becomes in the mounted state.

As a mechanism for operating by the shutter 70, the pin 71 is mounted at part of the position of the back surface (backboard connection surface) of the HDA 52. The pin 71 pushes to open the shutter 70 in an inner direction by physical contact to the shutter 70 along with the action of the HDA 52 which is inserted into the housing and connected to the backboard 33 via the connector 34. The shapes and mounting positions of the pin 71 and the shutter 70 are designed so that the vent hole 35 is fully opened through the push-opening of the shutter 70 by the pin 71 when the HDA 52 is connected.

As shown in FIG. 12A, when the HDA 52 is installed, the HDA 52 is inserted along the HDA guide section such as a guide rail with respect to the HDA mounted position from the front surface of the front-side housing 31 by the maintenance personnel etc. The HDA 52 has a connector 37 connected to the connector 34 of the backboard 33. To the backboard connection surface of the HDA 52, for example, upper and lower two pins 71 are mounted. The shutter 70 is fixed to the backboard 33 by, for example, a hinge structure. The shutter 70 has a support 72 fixed to the backboard 33, and a rectangular door portion matched to the shape of the vent hole 35 via the hinge section is connected to the support 72 in such a manner to be opened and closed. The shutter 70 is of the construction in which a force is exerted by the hinge etc., so that the vent hole 35 is kept closed when no force by the contact of the pin 71 is applied.

As shown in FIG. 12B, by the complete insertion of the HDA 52 into the housing, the portion of the connector 37 of the HDA 52 is connected to the connector 34 of the backboard 33 and the HDD 51 is brought into a state communicably connected to the backboard 33. By the action of the HDA insertion and connection, the pin 71 located on the backboard contact surface of the HDA 52 pushes to open the door portion of the shutter 70 in the inner direction. In the HDA mounted condition, the door portion of the shutter 70 is kept open to 90° with respect to the vent hole 35. Similarly, when the HDA 52 is removed from the housing, the pin 61 retracts as it is removed, and the door portion of the shutter 70 rotates to keep the vent hole 35 in a closed state.

In addition, in the maximum closed state (fully closed state) of the shutter 70, the vent hole 35 is not necessarily fully closed, and, by partly opening the vent hole 35, the volume of the cooling air which passes the relevant vent hole 35 is restricted. That is, as shown in FIG. 12A, in the fully closed state, the opening/closing angle of the shutter 70 is brought to nearly 0° to the plane of the vent hole 35, and the vent hole 35 is closed along with part of the open area being left. In the fully closed state, the area of the door portion of the shutter 70 corresponding to the vent hole 35 is designed to make smaller than the area of the vent hole 35 and, for example, to cover 80% of the area of the vent hole 35, so that the specified flow restriction that meets the HDA mounted section is exercised.

By adjusting the open area rate of the vent hole 35 through the shutter 70, the volume of the same level as that that at the HDA mounted section or as is the case when the dummy HDD is installed can be achieved. By properly arranging a condition of each vent passage in this way, the cooling efficiency to each section containing the HDD 51 by the cooling function can be held even when the HDA unmounted section is present.

Also, by adjusting the open area rate of the vent hole 35 through the shutter 70, in addition to such adjustment that levels of the volumes in the respective vent passages as described above are almost the same, the volume at the HDA unmounted section may be restricted to be greater than that at the HDA mounted section or at a time when the dummy HDD is installed. That is, the opening area of the vent hole 35 in the fully closed state of the shutter 70 is designed to be smaller than that at a time of being adjusted to be almost the same level as described above. By the large volume restriction in the relevant HDA unmounted section, in the HDA mounted section, the relatively larger volume of the cooling air is secured. By adjusting the condition of each vent passage in this way, if there is any HDA unmounted section, the cooling efficiency can be still more improved.

In addition, for example, the above-mentioned fully closed condition is not limited to the form in which the opening/closing angle of the shutter 70 is nearly 0° with respect to the plane of the vent hole 35, and may be in the form for opening the vent hole 35 at the specified angle. In such event, the volume is restricted in the same manner by allowing the cooling air to pass from the clearance by the specified angle between the vent hole 35 and the shutter 70 in the fully closed state.

Figure 13:
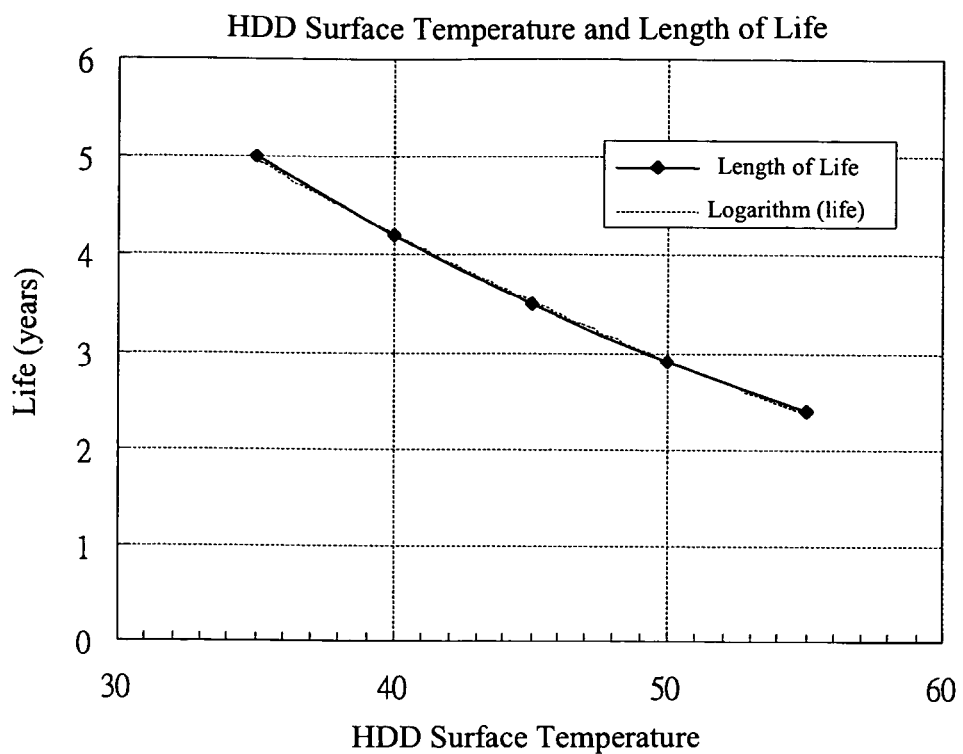
FIG. 13 is a graph showing a co-relation between HDD surface temperature and length of HDD's life in a technique premised on the present invention.

FIG. 13 is a graph showing the co-relation between HDD surface temperature and time (length) of HDD's life in a technique to be premised. In the relevant graph, the time of HDD's life to the HDD surface temperature is shown by logarithm. It indicates how the time of HDD's life degrades at an accelerating rate as the HDD surface temperature rises. Thus, since the HDD surface temperature greatly affects the time of HDD's life, efficiently cooling the HDD is the critical problem.

Conventionally, in utilizing the disk array system, extension and reduction of the HDDs (HDAs) by the maintenance personnel and others, replacement of failed HDDs, and others are required as occasions demand. In the event of the relevant work, variations occur in the vent condition of each vent passage in the housing as shown in FIG. 8 and FIG. 9 above. For example, if the HDA unmounted section is generated by the removal of the HDA, the volume of the cooling air at the HDA unmounted section increases and the volume of the HDA mounted section is lost by just that much, and the cooling efficiency lowers. The lowered cooling efficiency by the variation of the conditions of the vent passages, which is caused due to the above operation, increases the HDD surface temperature and exerts an effect on the shorting of the time of HDD's life. Consequently, even if the time of the above work is slight, it is desirable to suppress the variations and prevent the lowering of the cooling efficiency.

In the disk array system 10 of the present embodiment, by the mechanism of the shutter 70, since the shutter 70 is immediately opened and closed by the insertion and removal operations of the HDA 52 even in the event of the above-mentioned work, the variation of ventilation conditions of the respective vent passages can be suppressed even in a little time during the above-mentioned work. Consequently, it is possible to prevent the lowering the HDD cooling efficiency and to suppress degradation of time of the HDD's life by suppressing the effect on the HDD surface temperature.

As described above, according to the first embodiment, by opening and closing the shutter 70 by the insertion and removal operations of the HDA 52, the volume and flow velocity of the cooling air in each vent passage including the HDA mounted and unmounted sections in the whole housing can be adjusted, and the cooling efficiency to each section including the HDD can be held, and furthermore can be adjusted in accordance with the design. In addition, by carrying out the adjustment by the shutter 70, it is possible to eliminate the use of the dummy HDD for the relevant HDA mounted position.

Next, a description will be made of the disk array system in another embodiment related to the first embodiment. FIGS. 14 through 17 are diagrams indicating other constructions related to the shutter 70 as other embodiments. The whole hardware/software configurations of the disk array system of each embodiment are the same as that of the first embodiment, and the configuration of the portion related to the shutter 70 differs.

Second Embodiment

Figure 14:
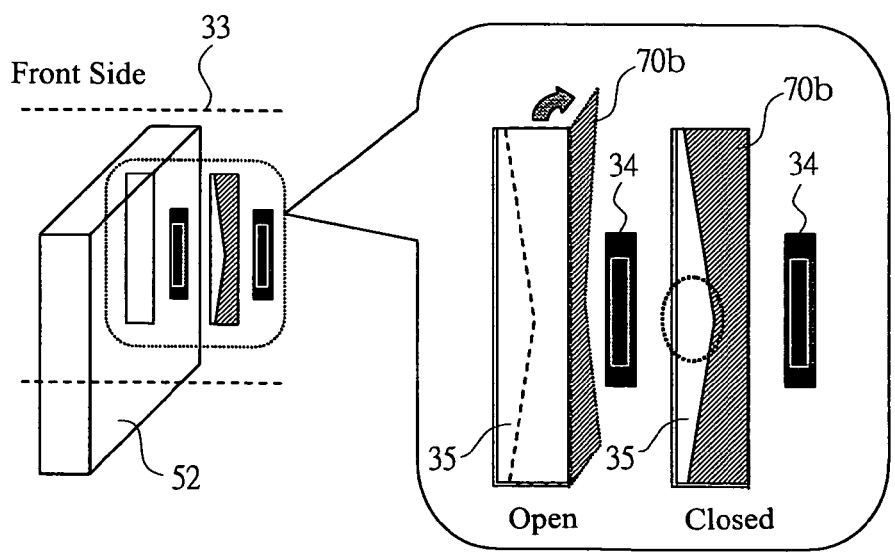
FIG. 14 is an explanatory view for showing a construction related to a shutter in a disk array system according to a second embodiment of the present invention, and schematically shows a vent hole and the shutter as viewed from a front surface side of a backboard.

FIG. 14 is an explanatory view for showing a construction related to the shutter 70b in a disk array system (disk array system) of a second embodiment. It schematically shows a vent hole 35 and a shutter 70b as viewed from the front of the backboard 33. In the first embodiment, a shape of the door portion of the shutter 70 has been designed to be a rectangle so that it matches the shape of the vent hole 35. However, as shown in the shutter 70b (shaded portion) of this Figure, it is possible to design it into a specified shape without being limited to a rectangle etc. By way of an example, the shape of the door portion of the shutter 70b is designed in such a manner that the vent hole 35 at the center has a larger opening than that at its edge in the closed condition of the shutter 70b. The relevant shape is a design example which meets the case in which a heat generating section is located at the position (shown by the dotted frame) near the center of the vent hole 35 in the back-side housing 32. By the relevant shape, the heat generating section can be effectively cooled. Thus, in addition to the opening and closing angle of the shutter 70b, the volume of the cooling air is adjusted in accordance with the shape of each section in the housing, particularly, in accordance with the shape of the shutter 70b in which the location of the heat generating section is considered. Also, efficient cooling can be achieved by designing the shutter 70 shape in accordance with the shape of the vent hole 35 similarly to the case of other embodiments in which each shape of the vent holes 35 is not rectangular.

Third Embodiment

Figure 15:
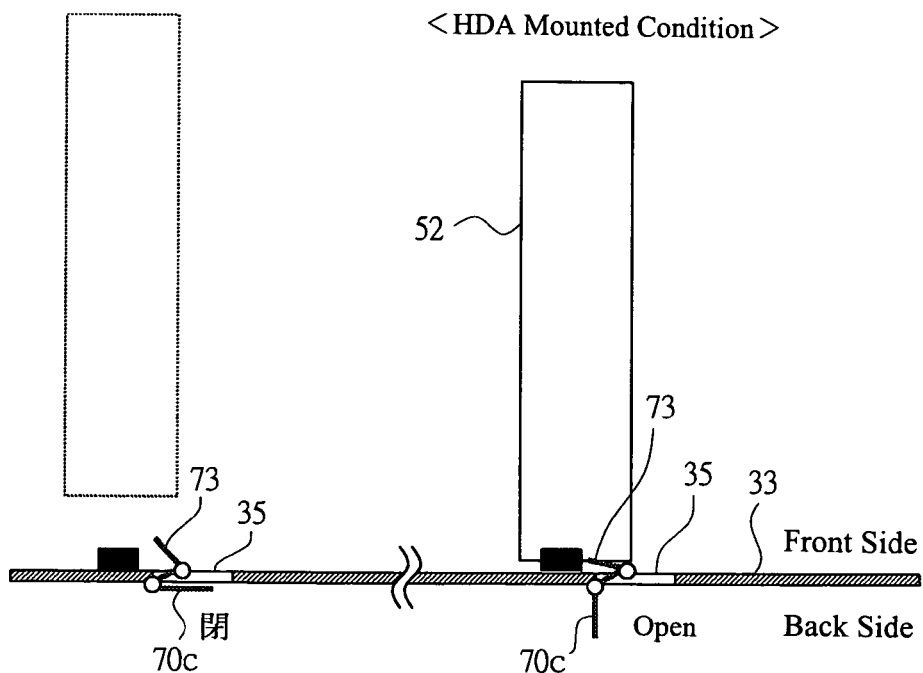
FIG. 15 is an explanatory view for showing a construction related to a shutter in a disk array system according to a third embodiment of the present invention, and shows a sectional view taken in a horizontal direction of a chassis on a condition of mounting or unmounting a HDA onto a backboard.

FIG. 15 is an explanatory view for showing a construction related to a shutter 70c in a disk array system (disk array device) of a third embodiment. It shows a sectional view taken in a horizontal direction of the housing in the mounted/unmounted conditions of the HDA onto the backboard. The mechanism for opening and closing the shutter 70 may not be limited to the press-opening mechanism by the pin 71 installed to the HDA 52 as described in the first embodiment. In the third embodiment, as shown in this Figure, a lever 73 which is a mechanism for operating by the door portion of the shutter 70c is installed on the front side (HDA mounted side) of the backboard 33. The lever 73 is located at such a position that a force is applied due to physical contact with the back surface of the HDA 52 by the insertion and contact of the HDA 52 and the lever is pressed down. It is a mechanical construction for opening the door portion of the shutter 70c by the relevant lever 73 as the lever 73 is pressed down to the surface of the backboard 33. Similarly, it is the construction for returning the lever 73 to the state prior to being pressed down by the removal of the HDA 52 from the housing, and for closing the door portion of the shutter 70c by it. In addition, the shape of the lever 73 is not limited to that at a time when parts which operate by the shutter 70c are installed on the front side of the backboard 33. For example, a mechanism for providing springs and other parts installed correspondingly to the contact surface of the HDA 52 in the front of the backboard 33 may be adopted. It is a mechanism in which the spring is pressed and contracted by the back surface of the HDA 52 at a time of insertion and connection and the force is exerted to the shutter 70c by this work and the shutter 70c is opened. In the third embodiment, in relation to the mechanism of the shutter 70c, a component (lever 73) is mounted on the front side of the backboard 33 in place of mounting the component (pin 71) to the HDA 52.

Fourth Embodiment

Figure 16:
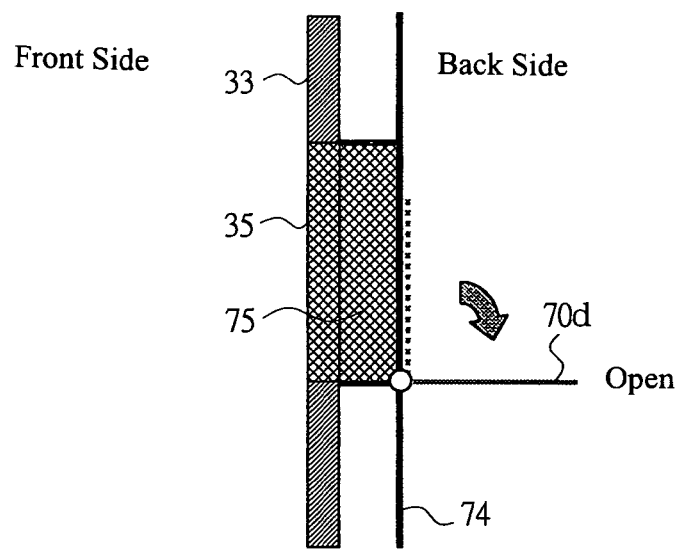
FIG. 16 is an explanatory view for showing a construction related to a shutter in a disk array system according to a fourth embodiment of the present invention, and is a sectional view taken in a horizontal direction of a chassis in a portion of a backboard.

FIG. 16 is an explanatory view for showing a construction related to a shutter 70d in the disk array system (disk array device) of a fourth embodiment. It shows a sectional view taken in a horizontal direction of the housing in the backboard 33. The position of installing the shutter 70 is not limited to the construction for directly installing the shutter to the backboard 33 as is the case of the first embodiment. In the fourth embodiment, as shown in this Figure, a shutter 70d is installed to a support structure 74 such as a sheet metal installed slightly away from the back of the backboard 33. In the case of this construction, a space region (75) from the vent hole 35 of the backboard 33 to the support structure 74 is made into an airtight conduit structure which serves as part of the vent passage of the cooling air. Similarly to the first embodiment, there is adopted the mechanism for opening and closing the shutter 70d by the mechanism of the pin 71 etc., which operates by the insertion and the removal of the HDA 52. In the case of this construction, the mechanism of shutter 70 which is part of the cooling function is not required to be directly mounted onto the backboard 33.

Fifth Embodiment

Figure 17A:
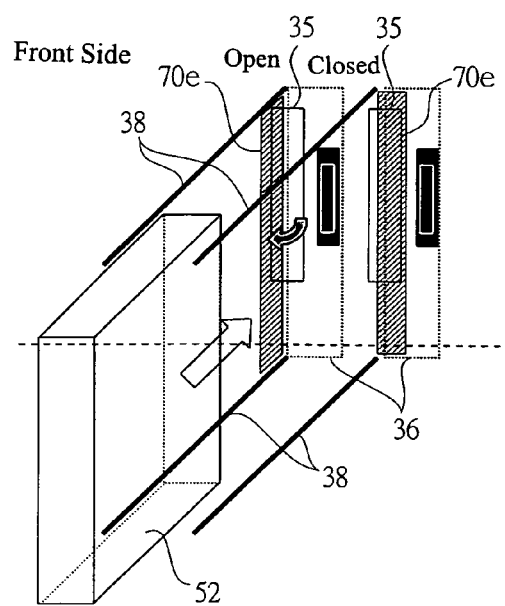
FIG. 17A is an explanatory view for showing a construction related to a shutter in a disk array system according to a fifth embodiment of the present invention, and is a perspective view as seen from a front surface side of a backboard.
Figure 17B:
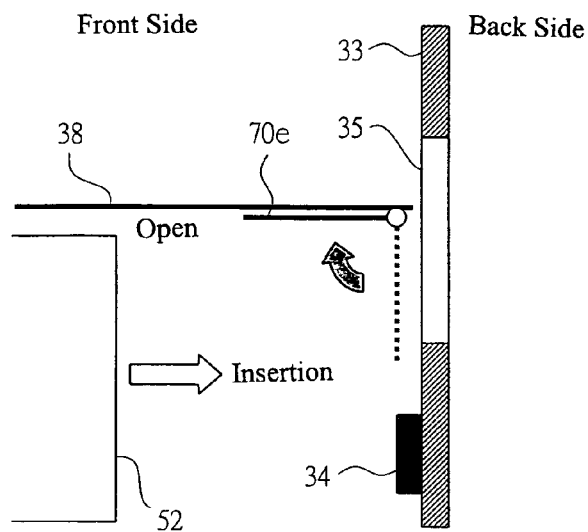
FIG. 17B is an explanatory view for showing a construction of a shutter in a disk array system according to a fifth embodiment of the present invention, and is a sectional view taken in a horizontal direction of a chassis in a portion of a backboard.

FIGS. 17A and 17B are explanatory views of a construction related to a shutter 70e in the disk array system (disk array device) of a fifth embodiment. FIG. 17A is a perspective view as seen from the front surface side of the backboard 33 and FIG. 17B is a sectional view taken in a horizontal direction of the housing in the backboard. The fifth embodiment has a construction for mounting a shutter 70e onto an HDA guide portion 38 installed inside the front-side housing 31 as shown in this Figure. The HDA guide section 38 has a structure that contains guide rails, support walls, or others for inserting and removing the HDA 52.

As shown in FIG. 17A, with respect to the vent hole 35 and the HDA connection surface 36 in the backboard 33, the shutter 70e is installed correspondingly to the surface of the HDA guide portion 38 in a longitudinal direction of the housing. For an example, the shutter 70e is installed across the upper and lower guide rails which serve as the HDA guide portion 38. As shown in FIG. 17B, it has a mechanical construction for opening the door portion of the shutter 70e in a near side direction by the operation to insert the HDA 52 along the HDA guide portion 38. Closing the shutter 70e brings the state where the vent hole 35 is closed with a portion of the open area being left similarly to the first embodiment. As the construction for opening and closing the shutter 70e, for example, a construction is adopted in which a mechanism corresponding to the above-mentioned lever 73 is provided at the position closer to this side than the shutter 70e at the HDA guide portion 38 and the shutter 70e is opened by the relevant lever that is pushed down through the contact by the insertion of the HDA 52. Similarly, the shutter 70e is closed by the relevant lever which returns to the original position by the removal of the HDA 52. In the case of this construction, it is unnecessary to mount the shutter 70e directly onto the backboard 33. Note that, as shown in this Figure, the size of the door portion of the shutter 70e may be designed to be larger than the size of the vent hole 35.

Sixth Embodiment

Figure 18:
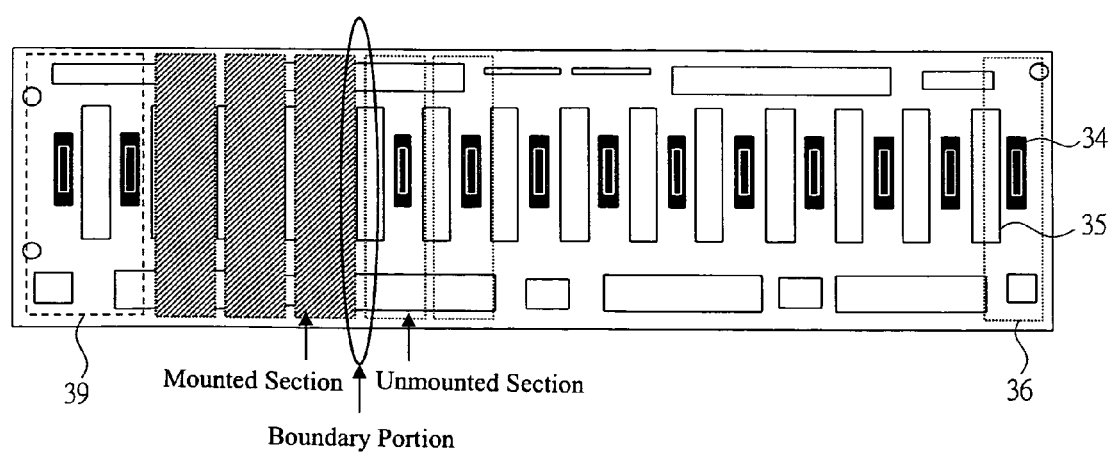
FIG. 18 is an explanatory view for showing a layout example of a front surface of a backboard with respect to a disk array system according to a sixth embodiment of the present invention.

As a disk array system (disk array device) of a sixth embodiment, a description will be made of a configuration in which addition of other HDD mounted sections and unmounted sections is considered with respect to each embodiment. FIG. 18 is an explanatory view for showing a layout example of the backboard front surface with respect to the disk array system of a sixth embodiment. First of all, a region 39 shown by a dotted-line frame indicates a mounted position of a drive normally mounted onto the housing. With respect to this kind of normally mounted drive, since no insertion and removal operations to and from the housing are carried out, it is unnecessary to provide a mechanism of the shutter 70 for this section. Thus, by considering arrangement etc. of the respective sections therein with respect to the plurality of vent holes 35 provided to the backboard 33, there is adopted a configuration in which sections with and without the above shutter 70 are mixed.

In addition, in the configuration in which the shutter 70 is provided with respect to the vent hole 35 of the backboard 33, as shown in FIG. 18, the flow velocity of the cooling air is lowered in a boundary portion between the HDA mounted section and the HDA unmounted section in the housing, and the cooling efficiency may be slightly lowered therein. The HDD cooling efficiency can be satisfactorily secured by each embodiment as described above. However, in the event that further measures to be taken for the relevant boundary portion are desired, it is possible to adopt the configuration as shown below.

For the configuration related to the boundary portion, first of all, there is adopted a configuration for charging dummy HDDs with respect to only the HDA unmounted sections which correspond to a relevant boundary section. In such event, since the dummy HDD is used for only the boundary portion, the number of dummy HDDs used is smaller than the conventional one. It is possible to combine the appropriate use of the dummy HDD with the provision of the shutter 70 as described in this embodiment.

A second configuration of the boundary portion is in the form in which a rectifying plate of an appropriate removable attachment system is attached to the relevant boundary section. By the installation of the rectifying plate, the region corresponding to the HDA 52 mounting position in the front-side housing 31 is made into a closed conduit construction. As such a configuration, for example, the rectifying plate is attached and removed along the HDA guide portion 38 in accordance with the location of the boundary portion. By the installation of the rectifying plate at the boundary portion, inflow of air from the adjacent regions is prevented and the same conditions as the ventilation conditions among the HDA mounted sections are achieved. By this, even in the boundary portion, the volume and flow velocity of the cooling air are secured.

A third configuration of the boundary portion is in the form in which the same rectifying plate as the rectifying plate on the HDA 52 side is provided with respect to the relevant boundary portion. By adopting the construction in which the conduit is closed at the HDA 52 in place of the region inside the housing, the same conditions as the ventilation conditions among the HDA mounted sections are achieved and the volume and flow velocity of the cooling air are secured.

In each embodiment of the present invention, a structure such as shutter 70 is provided on the side of the backboard 33 in the housing. However, it is possible to have a configuration in which a structure(s) corresponding to the shutter 70 or others is provided on the front side of the housing with respect to the vent hole 35 of the backboard 33, too. In the region of the front-side housing 31, a structure such as a shutter is installed in such size as to cover the surface with respect to the position (HDA mounted position 36 etc. shown in FIG. 18) of inserting and removing the HDA 52 of the opening in the front surface. The area from the housing front to the backboard 33 which is a partial unit for installing and accommodating the HDA 52 is made into an independent airtight conduit construction. To achieve the airtight conduit construction, for example, a configuration having structures such as partitions, walls, and others provided for isolating each HDA 52 mounted is adopted. In addition, between sheet metals, packing, and other parts may be used. The shutter provided to the housing front is of a mechanism, which opens in accordance with the mounting of the HDA 52 similarly to each embodiment and closes in accordance with the unmounting of the HDA 52. For example, it is a mechanism in which the door portion of the relevant shutter is opened to an angle of 90° in the inner direction due to the physical contact by the insertion of the HDA 52 to form the opening-bay, in which the cooling air flows, and is returned to the original position by the removal of the HDA 52 to close the drive-bay of the front surface. By this kind of configuration, the cooling efficiency to each section including the HDD can be maintained similarly to the first embodiment etc., and the use of the dummy HDD becomes unnecessary by controlling the area through which the cooling air flows in the front surface of the housing, instead of controlling the open area rate of the vent hole 35 of the backboard 33 in the vent passage.

Seventh Embodiment

Next, a description will be made of the disk array system (disk array device) according to a seventh embodiment of the present invention. The seventh embodiment further has a positive control means for the shutter 70 by developing the first embodiment etc. The disk array system according to the seventh embodiment has a configuration in which a software and hardware configuration as a shutter-opening/closing control function is added to the first embodiment etc. In the first embodiment, the volume of the cooling air flowing in each vent passage of the housing is adjusted by opening and closing the shutter 70 in accordance with the mounted/unmounted condition of the HDA 52. In the seventh embodiment, the opening and closing angles of the shutter 70 are positively controlled by the shutter opening/closing control function on the basis of judgment of various factors related to the cooling, like a power-operated condition etc., in addition to the opening/closing mechanism of the shutter 70 by the mounting condition of the HDA 52. By this, the volume of the cooling air in each vent passage of the housing is adjusted and the efficient cooling is achieved by the cooling function. In addition, particularly in the seventh embodiment, control for varying the fan rotating speed in the housing in accordance with the system condition (device condition) by the cooling function is combined to carry out the control of the opening/closing angle of the shutter 70. The control of the shutter angle includes: the power condition monitoring and the HDD condition monitoring equipped with the power controller board 56; control of cooling capabilities of the cooling function; temperature control; other functions of each section inside the housing; and functions with which the controller 500 is equipped.

Figure 19:
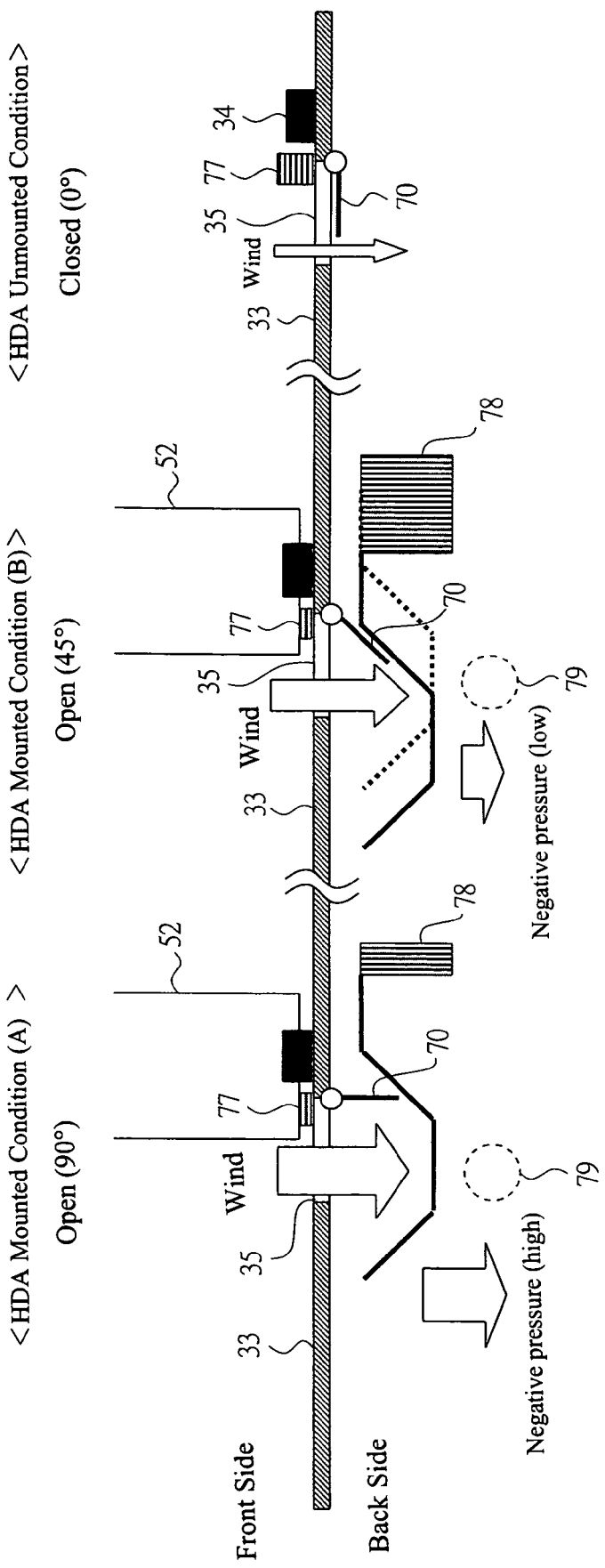
FIG. 19 is an explanatory view for showing outline of a shutter opening/closing controlling function in a disk array system according to a seventh embodiment of the present invention.

FIG. 19 is an explanatory view for showing the outline of a shutter opening/closing control function in the disk array system of the seventh embodiment. It is a perspective view taken in a horizontal direction of the housing and shows a portion related to the shutter angle control in a longitudinal surface of the backboard 33. This Figure, in particular, shows control examples of the shutter angle corresponding to the case where variation of the fan rotating speed is controlled in accordance with the operated condition on the side of the back-side housing 32 equipped with the power unit 57 in the extended chassis 30.

With respect to the position of the vent hole 35 of the backboard 33, the shutter 70 is installed. On the front side of the backboard 33, that is, in the front-side housing 31 to which the HDA 52 is installed, a specified mechanism for opening and closing the shutter 70 by the mounting state of the HDA 52 is provided similarly to each embodiment. In this Figure, by way of an example, there is shown a configuration having a spring portion 77 that forms part of the shutter opening/closing mechanism installed on the front side of the backboard 33. It is a mechanism for opening the shutter 70 by pressing the spring portion 77 from the back surface of the HDA 52 and applying a force to the shutter 70 by the operation of the connecting HDA 52 to the backboard 33 via the connector 34. As shown in the right side of this Figure, when the HDA is not mounted, no force is applied to the spring portion 77 and the shutter 70 that operates by this is held to the closed condition. As shown in the left side thereof, when the HDA is mounted, a force is applied to the spring portion 77 by the contact of the HDA 52 with the backboard connection surface, and the shutter 70 which operates by this holds the opening condition. Under a condition in which no control by the shutter opening/closing control function is exercised, the shutter 70 makes an angle of, for example, 90° with respect to the plane of the vent hole 35 in the fully opened state.

On the back surface side of the backboard 33, that is, in the back-side housing 32 on which the power unit 57, the cooling fan unit 58, and others are mounted, a slide portion 78 is installed with respect to the vent hole 35 and the shutter 70 as a shutter opening/closing section which forms part of the shutter opening/closing control function. The slide portion 78 has its operation controlled in accordance with the control from the host processors such as the power unit 57, the controller 500, and others.

In the back-side housing 32, for the fan equipped with the cooling fan unit 58 and the power unit 57, the negative air pressure on the side of the back-side housing 32 is lowered when the fan is controlled at a low rotating speed. Consequently, in the seventh embodiment, control is carried out to open and close the shutter 70 from the side of the back-side housing 32 by the shutter opening/closing control function, to control the open area rate of the vent hole 35 which corresponds to the position having small negative air pressure, and to secure the flow velocity of the cooling air. At this time, the relation "volume>pressure loss" is achieved. In addition, when the HDA is not mounted, the shutter 70 is brought to the fully closed state and is restricted to prevent the cooling air from flowing at the volume exceeding a specified level. At this time, the relation "volume=pressure loss" is achieved.

In the back-side housing 32, the slide portion 78 can slide in parallel to the plane of the backboard 33 in accordance with the control from the host processor. The slide portion 78 has a physical shape having a wall of, for example, an irregularly shaped dent as shown in this Figure, and slides in the side surface direction of the back-side housing 32 in accordance with the motor control and others from the host processor. For the shape of the slide portion 78, various shapes such physical shapes having lines, which are bent in dented and protruded forms, are available in addition to the wall shape. By the slide action of the slide portion 78, the wall comes in physical contact with the shutter 70 and the shutter 70 is gradually closed in accordance with the degree of the slide action. In this way, by the action of the slide portion 78, the opening/closing angle of the shutter 70 is restricted and adjusted. Note that the wall of the slide portion 78 is provided to a lower portion, an upper portion, etc. in the back-side housing 32 so as to prevent interference to flow of the cooling air.

The left side of FIG. 19 indicates the fully open condition in which the shutter 70 is opened to the maximum, that is, a state of a 90° shutter angle when the HDA is mounted, and in which the slide portion 78 is located at the initial position and the shutter angle control is not carried out. The middle of FIG. 19 indicates a state where the shutter 70 is about to open in the HDA mounting condition similarly, that is, where the shutter 70 angle is restricted by the slide action of the slide portion 78 and the shutter angle is held to 45° (half-open condition). If the slide portion 78 slides again from this half-open condition and returns to the original initial position, also the angle of the shutter 70 returns to the fully open condition (90°) again.

In the back-side housing 32, inside the power unit 57 and others, a heat generating section 79 is located. This is indicated as a portion that particularly requires cooling. In FIG. 19, an example in which the heat generating section 79 is located at the position behind the vent hole 35 of the backboard 33 is shown. The cooling air which enters and flows from the vent hole 35 to the back-side housing 32 passes as it is in the back surface direction of the housing via the power unit 57 and others. As a control example, the slide portion 78 is slid in accordance with the magnitude of the negative air pressure inside the power unit 57 and the opening/closing angle of the shutter 70 is adjusted. As shown by the left side of FIG. 19, when the negative air pressure inside the power unit 57 is high, the shutter 70 is adjusted to the fully open condition by the shutter opening/closing control function so that the volume of the cooling air at the corresponding position increases. In addition, as shown by the middle of FIG. 19, when the negative air pressure inside the power unit 57 is low, the shutter 70 is adjusted to the half-open condition by the shutter opening/closing control function so that the volume of the cooling air at the corresponding position decreases, and is controlled to prevent the flow velocity of the cooling air from dwindling. By this kind of control, it is possible to achieve efficient cooling in accordance with the location of the heat generating section 79 in the back-side housing 32, the fan rotating state, the negative air pressure state, and others.

Figures 20A, 20B:
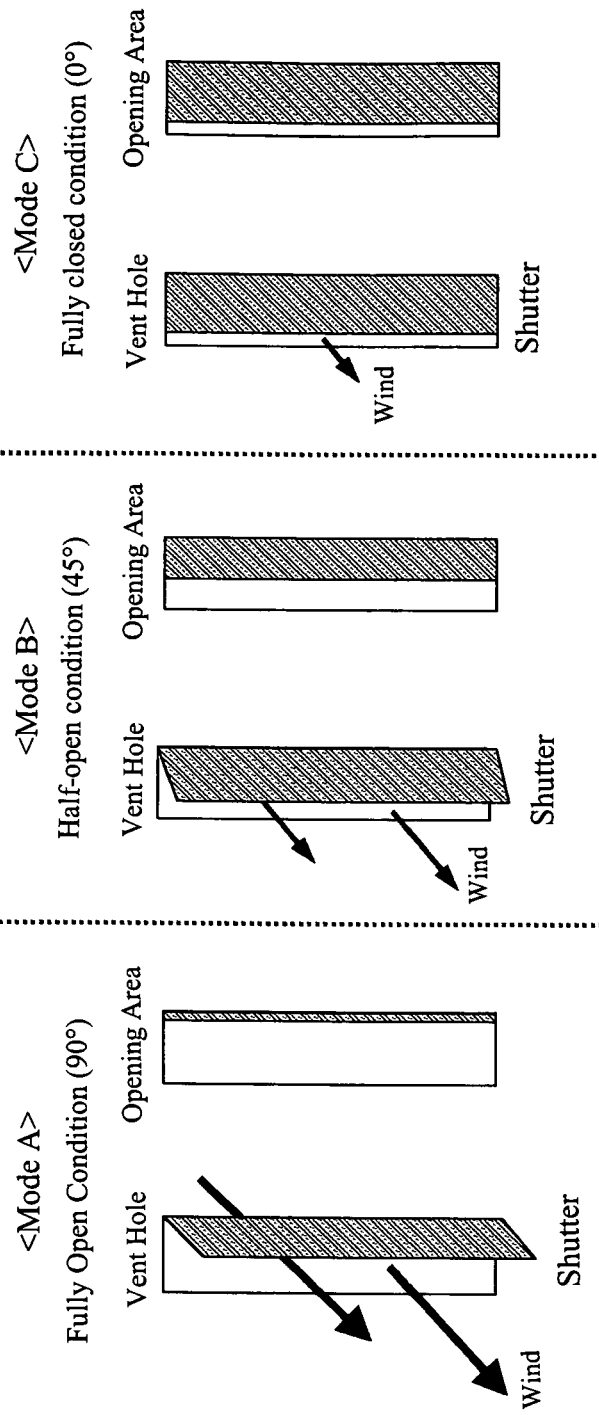
FIG. 20A is an explanatory view for showing control example of shutter opening/closing angles by a shutter opening/closing controlling function in a disk array system according to a seventh embodiment of the present invention.
FIG. 20B is an explanatory view for showing control example of shutter opening/closing angles by a shutter opening/closing controlling function in a disk array system according to a seventh embodiment of the present invention.

FIGS. 20A and 20B are explanatory views for showing control examples of the shutter opening/closing angles by the shutter opening/closing control function. The disk array system according to the seventh embodiment carries out control for changing the control mode of the shutter opening/closing angle in accordance with factors such as power-operated state, presence or absence of mounting of the HDA, and others by the power unit 57 or controller 500. FIG. 20A indicates a control mode example concerning the shutter opening/closing angle. In each mode, a degree of open area rate of the vent hole 35 in accordance with the shutter opening/closing angle is shown, too. For example, three modes, mode A, B, and C, are shown. The relevant control example is merely a simple example, and further meticulous control may be adopted for the shutter angle. FIG. 20B is a table which shows the correspondence between the control mode and the control factors. Circle portions in items indicate that corresponding control modes exist. As a technique to be premised of the shutter angle control, for example, control related to power supply and the fan is conducted in such a manner that the fan is rotated at a high rotating speed to increase the cooling efficiency at high power-operated time of the housing, and the fan is rotated at a low rotating speed to suppress power consumption at a low power-operated time.

At the high power-operated time of the housing, that is, during the high fan rotation speed, in the section having the HDD 51 mounted onto the backboard 33 (HDA mounted section), control for making the shutter 70 in the fully open condition is carried out as mode A. In the relevant fully open condition, the shutter is held at 90° with respect to the plane of the vent hole 35. The open area rate of the vent hole 35 becomes nearly 100%.

In addition, irrespective of the power-operated condition in the housing, at the section having no HDD 51 mounted onto the backboard 33 (HDA unmounted section), control for making the shutter 70 in the fully closed condition is carried out as mode C. In the relevant fully closed condition, the shutter 70 is held at 0° with respect to the plane of the vent hole 35. The open area rate of the vent hole 35 is such that a region of the opening except for a portion of the opening left in the maximum closed condition is closed.

In addition, at the low power-operated time in the housing, in the HDA mounted section, control for making the shutter 70 in the half-closed condition is carried out as mode B. In the relevant half-closed condition, the shutter is kept at 45° with respect to the plane of the vent hole 35. The open area rate of the vent hole 35 is about middle.

Figure 21:
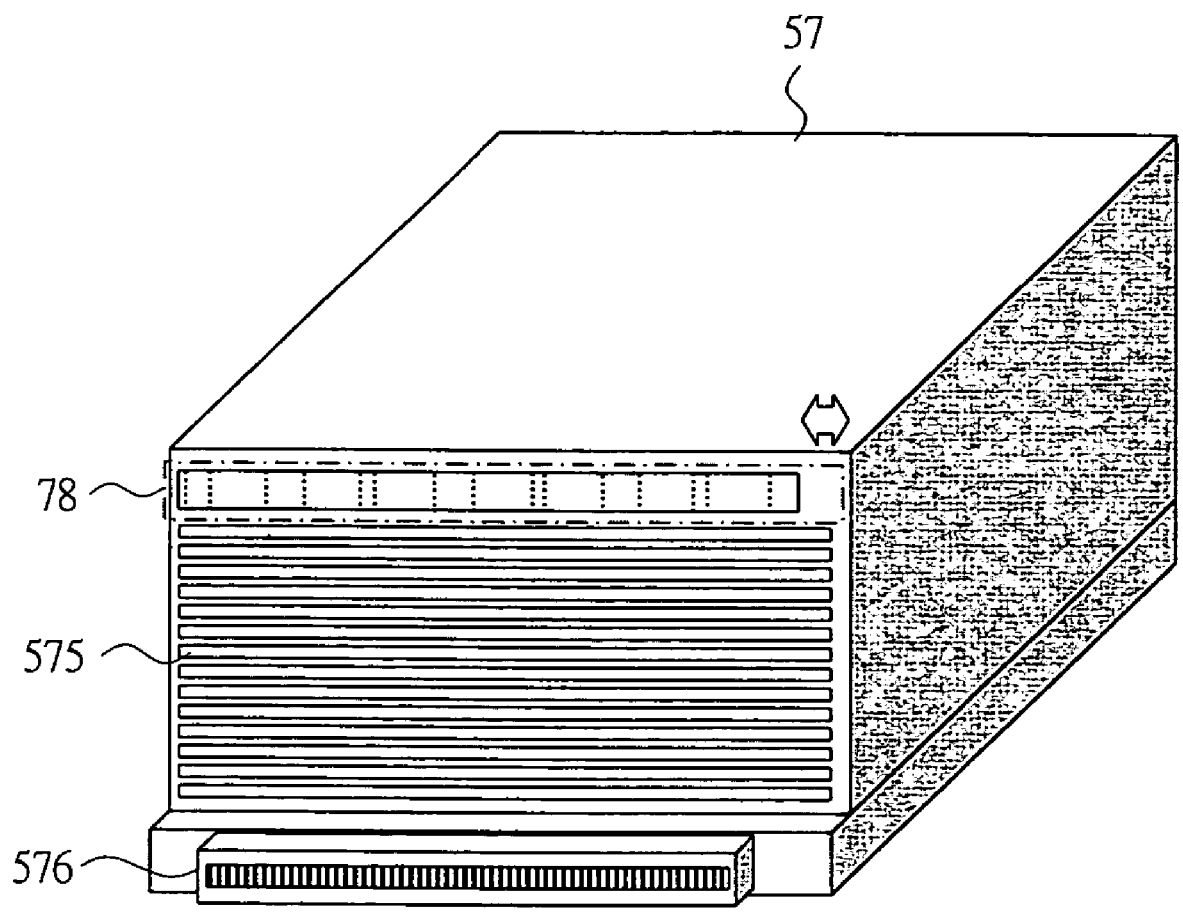
FIG. 21 shows a hardware appearance configuration of a power unit to be mounted on a chassis that configures a disk array system according to a seventh of the present invention, and is a perspective view as seen from a side of a surface of connection of a power unit to a backboard.

FIG. 21 shows a hardware appearance configuration of a power unit 57 to be mounted onto the back-side housing 32 that configures the disk array system of the seventh embodiment. In particular, it shows a perspective view as seen from the connection surface side to the backboard 33 in the power unit 57. The connection surface side of the backboard in the power unit 57 has an opening area 575 to allow the cooling air to pass. The surface opposite to the backboard connection surface in the power unit 57 is a surface on which the fan 574 is arranged. In the backboard connection surface in the power unit 57, a connector 576 is located at the lower side, and is connected to the corresponding connector section in the backboard 33. On the upper side, the slide portion 78 which is part of the shutter opening/closing control function is provided.

Figure 22A:
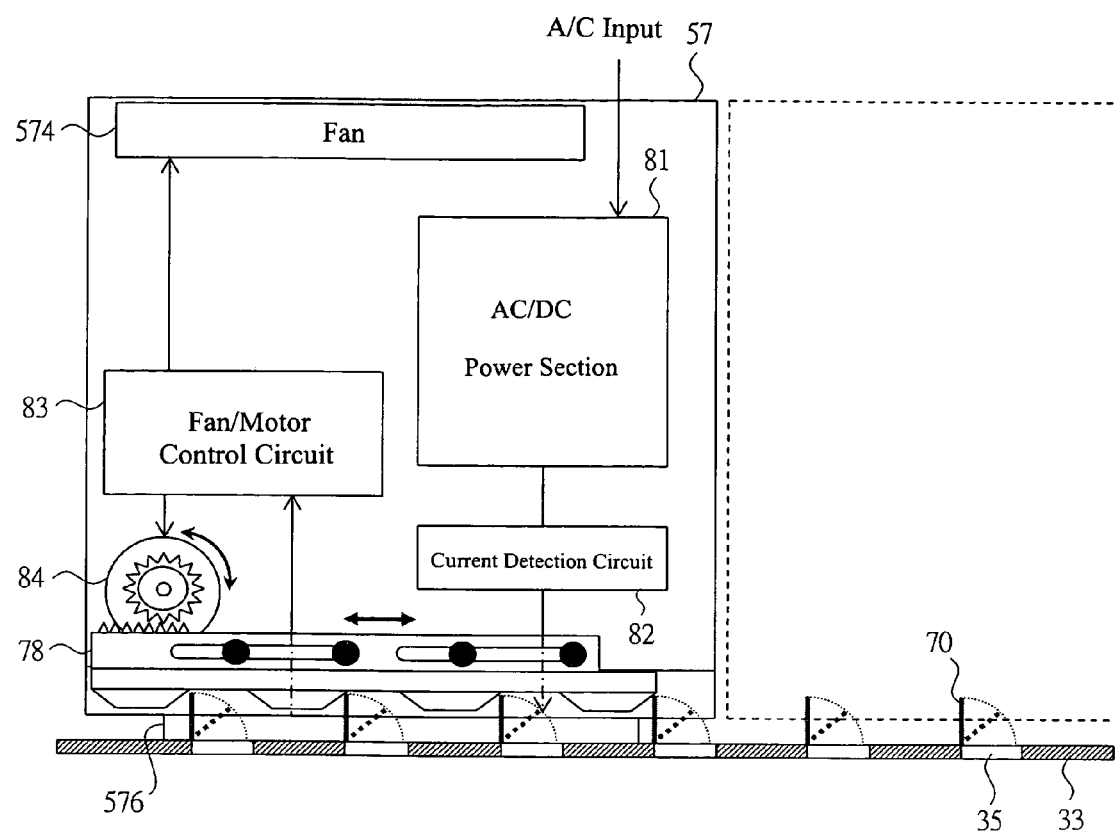
FIG. 22A is an explanatory view for showing a configuration related to a shutter opening/closing controlling function in a disk array system according to a seventh embodiment of the present invention with a shutter being opened.
Figure 22B:
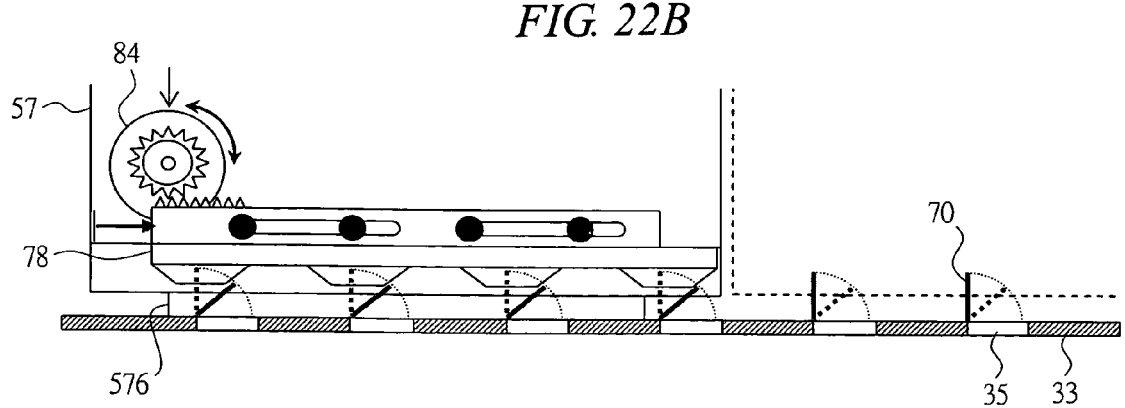
FIG. 22B is an explanatory view for showing a configuration related to a shutter opening/closing controlling function in a disk array system according to a seventh embodiment of the present invention with a shutter being closed.

FIGS. 22A and 22B are explanatory views for showing a configuration related to the shutter opening/closing control function in the disk array system of the seventh embodiment. FIG. 22A shows that the shutter 70 is in an open condition, and FIG. 22B shows that the shutter 70 is in a closed condition. As shown in FIG. 22A, in the back-side housing 32, the power unit 57 comprises an AC/DC power section 81 (corresponding to the AC/DC converter 571), a current detection circuit 82, a fan/motor control circuit 83, a motor 84, and a slide section 78 in addition to the fan 574 and the like.

The AC/DC power section 81 corresponds to the AC/DC converter 571. The current detection circuit 82 is a circuit which is provided in the DC output section 573 and detects a current of each section in order to control power supply etc. The power unit 57 monitors and checks the power-operated condition and controls the power supply and others on the basis of the current detected by the current detection circuit 82. In addition, the power unit 57 controls the rotation of the fan 574 on the basis of the recognition of the power-operated condition.

The fan/motor control circuit 83 is connected to the fan 574 and the motor 84 by the control line. The fan/motor control circuit 83 receives control signals from the controller 500 or power unit 57 through the backboard 33 and controls the fan 574 and the slide portion 78 in conformity to the signals. Each control signal and the power supply are connected to the wired-OR on the backboard 33. In the case where the power unit 57 is duplex-constructed, if one power unit 57 is down, power control and power-related control are continued by the other power unit 57. In such event, control signals for controlling the shutter angle etc. are fed from the other power unit 57 to the fan/motor control circuit 83, too.

The slide portion 78 has a slide mechanism driven by the motor 84. The motor 84 has rotation controlled by the control signal from the fan/motor control circuit 83. By the rotation of the motor 84, the slide mechanism of the slide portion 78 carries out a slide action in a side surface direction of the housing. By the slide action of the slide portion 78, the shutter is opened and closed by the force applied to the shutter 70 by the dented wall portion. In the configuration example of this Figure, a plurality of (for example, four) shutters 70 are collectively controlled to open or close in the unit of single slide mechanism in the slide power 78.

As the factor of the fan rotation control by the shutter angle control in the housing, the following is available. For example, there is the case in which a control source is on a side of the controller 500 or the power unit 57. If the control source is on a side of the controller 500, control factors include host-access frequency, power temperature, a degree of power unit redundancy, the number of HDDs installed, and a stopped HDD condition, etc. If the control source is on a side of the power unit 57, control factors include an operating mode, element temperature in power supply, and a used current, etc. The host-access frequency is the frequency of access from the information processor 300 to the disk array system 10, such as data read/write. The power temperature is the temperature in the AC/DC power section 81 and others. The degree of power unit redundancy is the degree of redundancy such as duplex configuration of the power unit 57. The number of HDDs mounted is the mounting number related to a plurality of HDAs 52 which can be mounted in the housing. The stopped HDD condition is presence or absence of the HDD in which is in an operation stop condition due to failure etc. in the housing. The operating mode is the operating mode such as standby, startup, normal, and others in the disk array system. The element temperature in the power supply is the temperature of the element located inside the power unit 57. The used current is a value of a current used in each section detected by the current detection circuit 82.

The control source judges various factors mentioned above and controls the fan to low rotation, for example, when there are not so many host accesses, when the temperature is low, when the degree of power unit redundancy is large, when the number of HDDs mounted is small, when any stopped HDD is present, when the operation mode is standby, when the element temperature in the power supply is low, when the used current at each section is low, and others. In addition, the control source controls the fan to a high rotation in the case opposite to the above case, such as when there are many host accesses, etc. The disk array system can cool each section in the system efficiently by carrying out the shutter angle control, that is, adjustment of the volume of the cooling air by adjustment of the open area rate of the vent hole 35 in each vent passage in cooperation with such fan rotation control.

Figure 23:
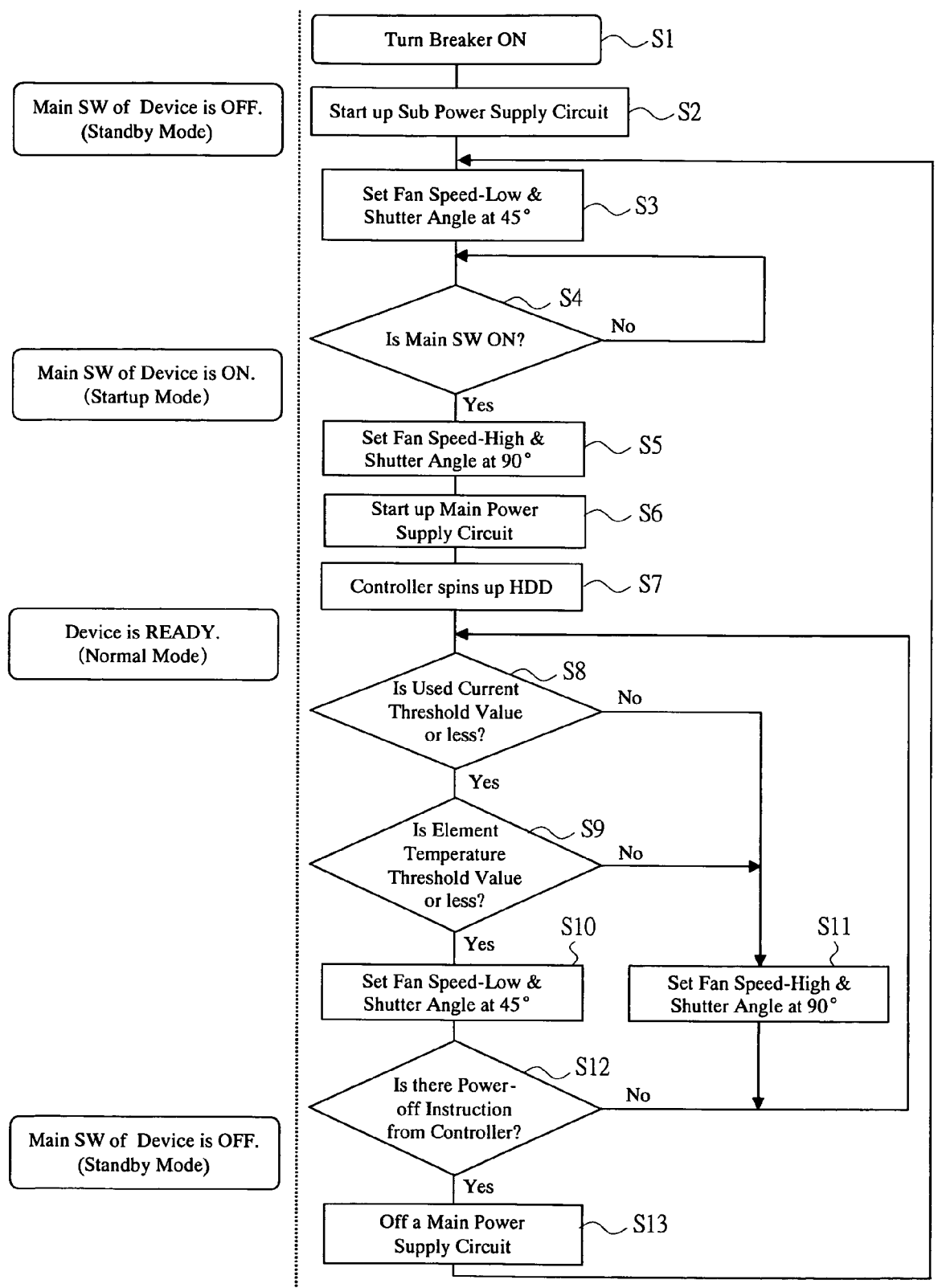
FIG. 23 is a flow diagram at a time of controlling a fan rotating speed and a shutter opening/closing angle on a side of a power unit in a disk array system according to a seventh embodiment of the present invention.

FIG. 23 shows a flow chart at a time when the fan rotating speed and the shutter opening/closing angle are controlled on a side of the power unit 57 in the disk array system of the seventh embodiment. The left side of the flow indicates a mode of the disk array system 10. When a breaker of the disk array system 10 is turned ON (S1) in an OFF state of a main switch of the disk array system 10, that is, in a standby mode, a sub power circuit equipped with the power unit 57 is started (S2). The sub power circuit is a circuit for supplying the minimum power to the disk array system 10. Then, on a side of the power unit 57, setting is carried out to keep the fan to low rotation speed on the side of the power unit 57 and, concurrently, to control mode B, that is, to set the shutter angle to the half-open condition where the shutter angle is 45° (S3).

Until the main switch of the disk array system 10 is turned ON, the standby mode is held. When the main switch is turned ON (S4-Yes), the system moves to a startup mode. The power unit 57 sets the fan to the high rotation speed and concurrently to the control mode A, that is, to the fully open condition where the shutter angle is 90° in the startup mode (S5). Then, the main power circuit is started by the power unit 57 and the controller 500 is energized (S6). The main power circuit is a circuit to supply power including the power supplied to the HDD 51. The started controller 500 spins up (starts up) each HDD 51 installed to the housing (S7).

When a start-up processing in the startup mode finishes, the disk array system 10 gets ready and moves to a normal (operational) mode. In the normal mode, the power unit 57 makes judgment with respect to the fan rotation speed control factor. The power unit 57 judges whether the used current detected by the power detection circuit 82 is a threshold value or less (S8). In addition, it judges whether the element temperature inside the power is a threshold value or less (S9). The power unit 57 sets the fan to the low rotation and the shutter angle to 45° (control mode B) when all the judgment results are Yes (S10). In addition, if there is any No in the judgment results, the power unit 57 sets the fan to high rotation speed and the shutter angle to 90° (control mode A) (S11). That is, the power unit 57 allows the fan/motor control circuit 83 to control the slide portion 78.

Until the main switch of the disk array system 10 is turned OFF, the normal mode is held. The power unit 57 carries out a processing for stopping the main power circuit (S13) when it receives a power-off instruction from the controller 500 (S12-Yes). As a result of this, the device moves to the standby mode and returns to carry out a processing of S3.

Figure 24:
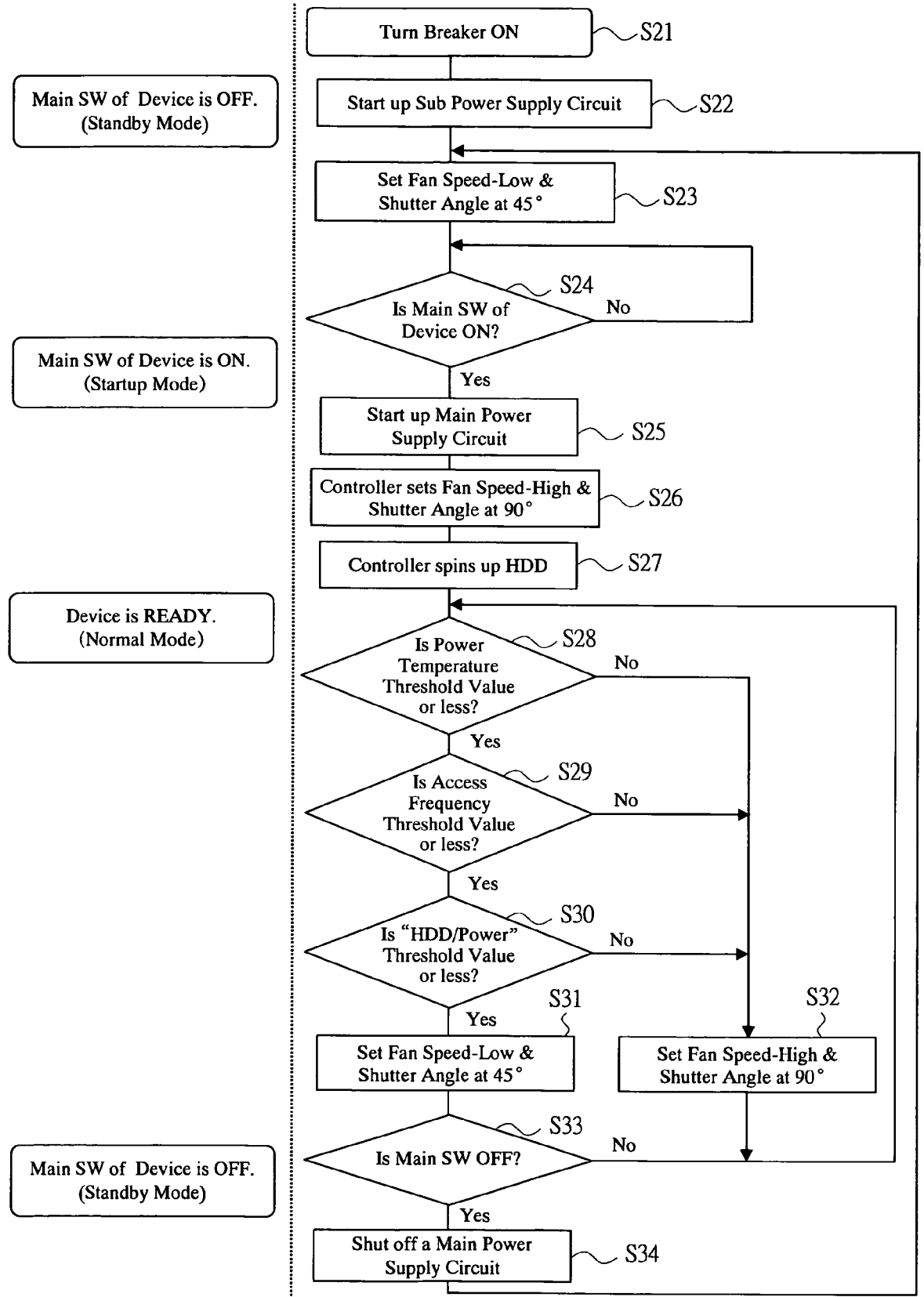
FIG. 24 is a flow diagram at a time of controlling a fan rotating speed and a shutter opening/closing angle on a side of a controller in a disk array system according to a seventh embodiment of the present invention.

FIG. 24 shows a flow chart at a time when the fan rotating speed and the shutter opening/closing angle are controlled on the side of the controller 500 in the disk array system of the seventh embodiment. The left side of the flow indicates a mode of the disk array system 10. When the breaker of the disk array system 10 is turned ON (S21) in the OFF state of the main switch in the disk array system, that is, in the standby mode, the sub power circuit equipped with the power unit 57 is started (S22). Then, on the side of the power unit 57, setting is carried out to keep the fan to the low rotation speed and, concurrently, to the control mode B, that is, to set the shutter angle to 45° (control mode B) (S23).

Until the main switch of the disk array system 10 is turned ON, the standby mode is held. When the main switch is turned ON (S24-Yes), the device moves to the startup mode. In the startup mode, the main power circuit is started on the side of the power unit 57 and the controller 500 is energized (S25). The started controller 500 sets the fan to high speed and the shutter angle to 90° (control mode A) (S26). The started controller 500 spins up each HDD 51 installed into the housing (S27).

When the startup processing in the startup mode finishes, the disk array system 10 moves to the normal mode. In the normal mode, the controller 500 makes a judgment on the control factors of the above-described fan rotation speed. The controller 500 judges whether the power temperature is a threshold value or less (S28). In addition, it judges whether the host-access frequency (load) is the threshold value or less (S29). In addition, it judges a ratio of the number of HDDs to the number of power units ("HDD/power") is the threshold value or less, that is, it judges a degree of the power unit redundancy, the number of HDDs mounted, the stopped HDD state, and others (S30). The controller 500 sets the fan to the low rotation speed and the shutter angle to 45° (control mode B) when all the judgment results are "Yes" (S31). If there is any "No" in the judgment results, the controller 500 sets the fan to the high rotation speed and the shutter angle to 90° (control mode A) (S32). That is, the controller 500 sends control signals to the power unit 57 and allows the fan/motor control circuit 83 to control the slide portion 78.

Until the main switch of the disk array system 10 is turned OFF, the normal mode is maintained. When the main switch is turned OFF (S33-Yes), the system moves to the standby mode. The controller 500 instructs the power unit 57 to stop the main power circuit and a processing for stopping the power circuit is carried out by the power unit 57 (S34). As a result of this, the system moves to the standby mode and returns to carry out a processing of S3. This concludes the processing flow.

In addition, besides providing the slide portion 78 and others comprising the shutter opening/closing control function to the power unit 57, there may be adopted the form in which the slide portion 78 and others are provided to a support structure and others on the back surface or behind the backboard 33. Furthermore, in the shutter opening/closing control function, the action of the shutter 70 is controlled by the slide portion 78. However, there may be adopted the form in which a second shutter structure is provided for adjusting the open area rate of the vent hole 35 separately from the shutter 70 and the action control is carried out to the second shutter structure.

In the disk array system of the seventh embodiment as described above, by opening and closing the shutter 70 by the mounting state of the HDA 52 and carrying out the opening/closing angle control of the shutter 70 in cooperation with the fan rotation speed control and others in conformity to the device state, the volume of the cooling air can be adjusted in each vent passage of the housing and efficiently cool each section inside the device. This is effective as an energy-saving technique, such as varying the degree of the fan rotation speed and the shutter angle in accordance with a power-operated state, a system load condition, and others.

The shutter angle control shown in the seventh embodiment may be combined with the shutter construction shown in each embodiment as described above. In such event, the shutter construction may not be limited to the door-form mechanism as shown in the first embodiment, and may be equipped with a mechanism for controlling the open area rate of the vent hole 35 in accordance with the shutter construction. That is, the open area rate of the vent hole 35 is controlled by the control similarly to that of the seventh embodiment by the physical and mechanical structure (shutter opening/closing section) which opens and closes the shutter in accordance with the shutter construction, the configuration having a processing section provided for controlling an operation of the shutter opening/closing section, and others.

Eighth Embodiment

Now, a description will be made of another embodiment of the present invention. As the disk array system (disk array device) of an eighth embodiment, for vent holes other than the vent hole 35 corresponding to the mounting and cooling of the HDD 51 and the flow inside the housing, control of the open area rate by opening and closing the shutter is carried out and the volume of the cooling air is adjusted.

Figure 25:
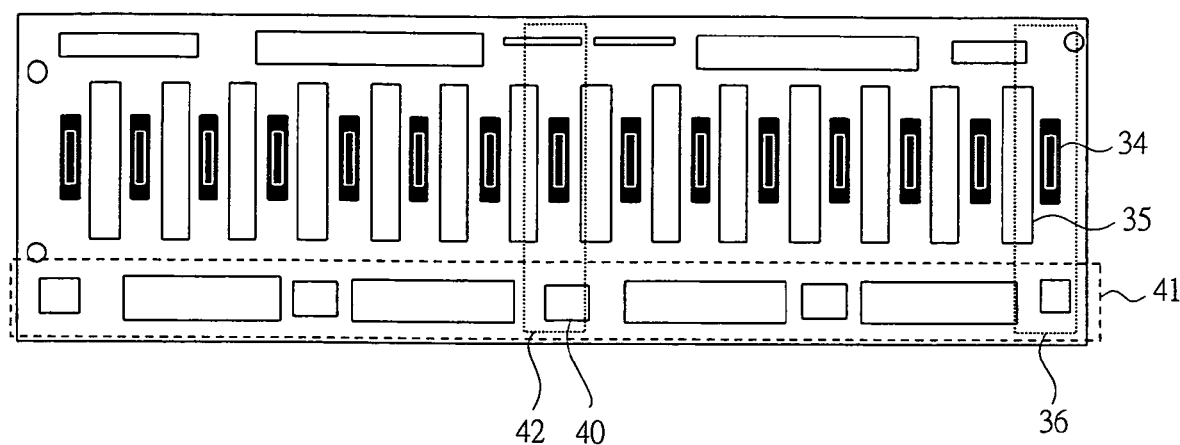
FIG. 25 is an explanatory view for showing a layout example of a front surface of a backboard with respect to a disk array system according to an eighth embodiment of the present invention.

FIG. 25 is an explanation view for showing a layout example of the backboard front surface with respect to the disk array system of the eighth embodiment. On the backboard 33, a vent hole 40 other than the vent hole 35 corresponding to cooling of the HDD 51 and the flow inside the housing is installed, too. The other vent hole 40 indicates one example of the backboard 33. A region 41 shown by the dotted frame indicates a region located at the lower portion of the housing as an example of a region which contains the other vent hole 40. In addition, the region 42 shown by the dotted-line frame indicates an example of the HDA mounted position containing the other vent hole 40. In a configuration for carrying out the shutter opening/closing control for the other vent hole 40, there is following examples.

As a first example for carrying out control for the other vent hole 40, in accordance with the other vent hole 40 in addition to the vent hole 35 for the HDD cooling in the backboard 33 and in accordance with the mounting state of the HDA 52 from the HDA mounting side (front-side housing 31) similarly to the first embodiment etc., the opening and closing of the shutter 70 is controlled. The relevant control is divided into further two configurations.

As a first configuration for carrying out control to the other vent hole 40 from the HDA mounting side, there is a mechanism in which the shutter 70 is provided to the other vent hole 40 similarly to the vent hole 35 and is opened and closed by the insertion and removal of the HDA 52. For example, there is adopted a mechanism in which the shutter 70 is provided so as to correspond to the vent hole 35 and the other vent hole 40 for cooling the HDD in the HDA mounted position 42 and the relevant shutter 70 is opened and closed in accordance with the insertion and removal of the HDA 52.

As a second configuration for carrying out control to the other vent hole from the HDA mounting side, there is adopted a mechanism in which the shutter 70 is controlled so as to consider a total volume of the cooling air in the vent hole 35 and other vent hole 40 for cooling the HDD. For example, the HDA mounted position 42 is designed so that although the shutter for opening and closing the other vent hole 40 is not provided and the open area rate thereof is not limited, the shutter 70 that is provided to the vent hole 35 for the HDD cooling located at the relevant other vent hole 40 has a large area (area for closing the vent hole 35) etc. and an open area rate of the vent hole 35 is restricted to that of the other vent hole 40.

As a second example for carrying out control to the other vent hole 40, similarly to the seventh embodiment, from the side of the power unit 57, the controller 500, the cooling fan unit 58, and others (back-side housing 32) for the other vent hole 40 in addition to the vent hole 35 for the HDD cooling in the backboard 33, the opening and closing of the shutter 70 is controlled on the basis of the judgment of the device state. For the relevant control, the same control as those in two configurations for carrying out control from the HDA mounted side is conducted. That is, as a first configuration, a mechanism for installing the shutter with respect to the other vent hole 40 and for opening and closing the shutter in accordance with the mounting state of the HDA 52 is adopted, and, at the same time, the opening/closing angle of the relevant shutter 70 is controlled in accordance with the judgment of the device state from the control source such as the power unit 57 and the volume of the cooling air of the other vent hole 40 is adjusted. This form is the best mode according to the present invention. As a second configuration, a mechanism for opening and closing the shutter 70 is adopted in the light of the total volumes of the cooling air at the vent hole 35 and the other vent hole 40 for the HDD cooling, and, at the same time, the opening/closing angle of the relevant shutter 70 is controlled in accordance with the judgment of the system state from the control source. In this way, it is possible to carry out efficient cooling throughout the whole housing by controlling the volume of the cooling air using the shutter not only for the vent hole 35 but also for the other vent hole 40 for mounting and cooling of the HDA 52.

In the foregoing description, the invention made by the present inventors has been specifically explained based on the embodiments. However, needless to say, the present invention is not limited to the above embodiments and can be variously altered and modified without departing from the gist thereof.

The present invention is available as a cooling technique used in a disk array system etc.

What is claimed is:

1. A disk array device comprising:
    a storage unit;
    a controller for controlling storage of data into said storage unit;
    a power unit for supplying power to each section;
    a fan for air cooling an interior of a housing;
    a backboard for connecting each section, the storage unit being connected to one surface of the backboard through a connector;
    a cooling function of allowing cooling air to flow into the housing by an operation of said fan and exhausting the cooling air from the housing via a region to which said storage unit is installed and a vent hole provided in said backboard; and
    a shutter having a mechanism which corresponds to the vent hole of said backboard and in which an open area rate of said vent hole is adjusted by opening in accordance with mounting of said storage unit and closing in accordance with unmounting thereof.

2. The disk array device according to claim 1,
    wherein said housing has a construction in which a region where a plurality of said storage units are mounted in a row is arranged on one side of the housing through the backboard in-between and said fan and said power unit arranged on the other side, and
    has a vent passage in which said cooling air flows by an operation of said fan from a side of a surface on which said storage unit of the housing is mounted and is exhausted from a side of a surface mounted on said fan and said power unit of the housing.

3. The disk array device according to claim 1,
    wherein said vent hole is provided in units of a mounting location of said storage unit and said shutter is provided in units of said vent hole.

4. The disk array device according to claim 1,
    wherein said shutter has such a construction as to keep part of a region of said vent hole open with said shutter being closed to the maximum under an unmounted condition of said storage unit, and, by the construction of said shutter, volumes of the cooling air at a mounted section of said storage unit and that of at an unmounted section are adjusted so as to be almost the same.

5. The disk array device according to claim 1,
    wherein said shutter has a construction in which an area closing said vent hole is designed in such a manner that a volume of the cooling air at a mounted section of said storage unit is greater than that at an unmounted section.

6. The disk array device according to claim 1,
    wherein said shutter has a mechanism of being opened/closed like a door and of being open-pushed by a convex structure provided on a side of a backboard connection surface of said storage unit when said storage unit is mounted.

7. The disk array device according to claim 1, wherein said shutter is arranged and formed to guide flow of the cooling air in accordance with arrangement of a cooled object portion before and after said vent hole.

8. The disk array device according to claim 1, wherein said shutter has a mechanism of being opened by such motion that a convex structure provided on a surface of said backboard, on which said storage unit is mounted, is pressed by said storage unit when said storage unit is mounted.

9. The disk array device according to claim 1, wherein said shutter has such a vent-passage configuration as to be provided to a support structure provided behind said backboard in the housing and to seal a region from the vent hole of said backboard to the shutter provided to said support structure.

10. The disk array device according to claim 1, wherein said shutter has such a mechanism as to be provided to a guide portion for mounting said storage unit in a region located on a side on which said storage unit is mounted in the housing and to open by insertion of said storage unit and close by its removal.

11. The disk array device according to claim 1, further comprising:
a rectifying means being so that, at a boundary portion between a mounted section and an unmounted section of said storage unit in the housing, a region of the vent passage corresponding to a mounting position of said storage unit is formed into a conduit construction independent from an adjacent region.

12. The disk array device according to claim 1, wherein said shutter is provided so as to correspond to both the vent hole corresponding to mounting and cooling of said storage unit and other vent hole other than it on said backboard, and
a volume of the cooling air at said other vent hole is controlled by opening and closing said shutter in accordance with a mounting condition of said storage unit.

13. A disk array device comprising:
a storage unit;
a controller for controlling storage of data into said storage unit;
a power unit for supplying power to each section;
a fan for air cooling an interior of a housing;
a backboard for connecting each section, the storage unit being connected to one surface of the backboard through a connector;
a cooling function of allowing cooling air to flow into the housing by an operation of said fan and exhausting the cooling air from the housing via a region to which said storage unit is installed and a vent hole provided in said backboard;
a shutter having a mechanism which corresponds to the vent hole of said backboard and in which an open area rate of said vent hole is adjusted by opening in accordance with mounting of said storage unit and closing in accordance with unmounting thereof; and
a control means for adjusting a volume of said cooling air by controlling the open area rate of said vent hole in accordance with judgment of a device condition related to cooling.

14. The disk array device according to claim 13, wherein said control means controls the open area rate of said vent hole in combination with control of a fan rotating speed using said fan based on the judgment of the device condition related to said cooling.

15. The disk array device according to claim 13, wherein said shutter is provided so as to correspond to both the vent hole corresponding to mounting and cooling of said storage unit and other vent hole other than it on said backboard, and
a volume of the cooling air at said other vent hole is controlled by opening and closing said shutter in accordance with the judgment of the device condition.

16. The disk array device according to claim 13, wherein said control means comprises:
a shutter opening/closing section located near said backboard and carrying out an operation of adjusting the opening/closing of said shutter;
a processing section for controlling an operation of said shutter opening/closing section in accordance with the judgment of said device condition.

17. The disk array device according to claim 16, wherein said power unit has said processing section and judges a power condition in the housing, as the device condition related to the cooling.

18. The disk array device according to claim 16, wherein said control unit has said processing section and judges a device load condition and a condition related to mounting and operating of said storage unit, as the device condition related to said cooling.

19. The disk array device according to claim 16, wherein said shutter has a mechanism for making opening/closing operations on a back side of said backboard, and
said shutter opening/closing section has a slide portion for making a slide operation in parallel to a surface of said backboard, and has a mechanism for opening and closing said shutter by contact of said slide portion with said shutter located on a back surface side of said backboard.

20. The disk array device according to claim 16, wherein said power unit includes: a fan on a back surface side of the housing; said shutter opening/closing section on a connection surface side of the backboard; and a circuit for controlling an operation of said fan and said shutter opening/closing section by a control signal as said processing section.

* * * * *